US012794200B2

(12) United States Patent
Casey et al.

(10) Patent No.: US 12,794,200 B2
(45) Date of Patent: Nov. 10, 2026

(54) DEVICES AND METHODS RELATED TO GDT AND MOV COMBINATION

(71) Applicant: Bourns, Inc., Riverside, CA (US)

(72) Inventors: Kelly Casey, Corinth, TX (US); Gordon L. Bourns, Riverside, CA (US)

( * ) Notice: Subject to any disclaimer, the term of this patent is extended or adjusted under 35 U.S.C. 154(b) by 0 days.

(21) Appl. No.: 18/634,907

(22) Filed: Apr. 13, 2024

(65) Prior Publication Data

US 2024/0275136 A1 Aug. 15, 2024

Related U.S. Application Data

(63) Continuation of application No. 17/178,270, filed on Feb. 18, 2021, now Pat. No. 11,962,131, which is a continuation of application No. PCT/US2019/049008, filed on Aug. 30, 2019.

(60) Provisional application No. 62/726,094, filed on Aug. 31, 2018.

(51) Int. Cl.

*H01T 4/10* (2006.01)
*H01C 7/112* (2006.01)
*H01C 7/12* (2006.01)

(52) U.S. Cl.

CPC ............... *H01T 4/10* (2013.01); *H01C 7/112* (2013.01); *H01C 7/12* (2013.01)

(58) Field of Classification Search

CPC . H01C 7/112; H01C 7/12; H01C 7/126; H01J 61/06; H01J 61/305; H01J 61/361; H01J 9/18; H01J 9/265; H01J 9/28; H01T 1/14; H01T 1/16; H01T 1/20; H01T 4/04; H01T 4/10; H01T 4/12

See application file for complete search history.

(56) References Cited

U.S. PATENT DOCUMENTS

| | | | | |
|---|---|---|---|---|
| 11,948,770 B2 * | 4/2024 | Casey | ...................... | H01J 17/04 |
| 11,962,131 B2 * | 4/2024 | Casey | ...................... | H01T 1/16 |
| 2016/0276146 A1 * | 9/2016 | Heath | ...................... | H01T 4/12 |
| 2021/0035715 A1 * | 2/2021 | Shu | ...................... | H01C 1/14 |
| 2022/0115202 A1 * | 4/2022 | Casey | ...................... | H01J 17/04 |
| 2023/0178273 A1 * | 6/2023 | Casey | ...................... | H01C 7/108 338/20 |

(Continued)

FOREIGN PATENT DOCUMENTS

| | | | | |
|---|---|---|---|---|
| CN | 107836032 B | * 11/2020 | ............. | H01J 61/06 |
| JP | 2012212535 A | * 11/2012 | | |

*Primary Examiner* — Jue Zhang
*Assistant Examiner* — Nicolas Bellido
(74) *Attorney, Agent, or Firm* — Chang & Hale LLP

(57) ABSTRACT

Integrated device having GDT and MOV functionalities. In some embodiments, an electrical device can include a first layer and a second layer joined with an interface, with each having an outer surface and an inner surface, such that the inner surfaces of the first and second layers define a sealed chamber therebetween. The electrical device can further include an outer electrode implemented on the outer surface of each of the first and second layers, and an inner electrode implemented on the inner surface of each of the first and second layers. The first layer can include a metal oxide material such that the first outer electrode, the first layer, and the first inner electrode provide a metal oxide varistor (MOV) functionality, and the first inner electrode, the second inner electrode, and the sealed chamber provide a gas discharge tube (GDT) functionality.

8 Claims, 21 Drawing Sheets

(56) References Cited

U.S. PATENT DOCUMENTS

2024/0347236 A1* 10/2024 Ulloa Esquivel ........ H01C 1/02

* cited by examiner

DEVICES AND METHODS RELATED TO GDT AND MOV COMBINATION

CROSS-REFERENCE TO RELATED APPLICATION(S)

This application is a continuation of U.S. application Ser. No. 17/178,270 filed Feb. 18, 2021, entitled INTEGRATED DEVICE HAVING GDT AND MOV FUNCTIONALITIES, which is a continuation of International Application No. PCT/US2019/049008 filed Aug. 30, 2019, entitled INTEGRATED DEVICE HAVING GDT AND MOV FUNCTIONALITIES, which claims priority to and the benefit of the filing date of U.S. Provisional Application No. 62/726,094 filed Aug. 31, 2018, entitled INTEGRATED DEVICE HAVING GDT AND MOV FUNCTIONALITIES, the benefits of the filing dates of which are hereby claimed and the disclosures of which are hereby expressly incorporated by reference herein in their entirety.

BACKGROUND

Field

The present disclosure relates to an integrated device having gas discharge tube (GDT) and metal oxide varistor (MOV) functionalities.

Description of the Related Art

A gas discharge tube (GDT) is a device having a gas between two electrodes in a sealed chamber. When a triggering condition such as a high voltage spike arises between the electrodes, the gas ionizes and conducts electricity between the electrodes.

A metal oxide varistor (MOV) includes a metal oxide material, such as zinc oxide, implemented between two electrodes. Under normal condition (e.g., at or below a rated voltage between the electrodes), the MOV is non-conducting, but becomes conducting when the voltage exceeds the rated voltage.

SUMMARY

In some implementations, the present disclosure relates to an electrical device that includes a first layer and a second layer joined with an interface, with each having an outer surface and an inner surface, such that the inner surfaces of the first and second layers define a sealed chamber therebetween. The electrical device further includes an outer electrode implemented on the outer surface of each of the first and second layers, and an inner electrode implemented on the inner surface of each of the first and second layers. The first layer includes a metal oxide material such that the first outer electrode, the first layer, and the first inner electrode provide a metal oxide varistor (MOV) functionality, and the first inner electrode, the second inner electrode, and the sealed chamber provide a gas discharge tube (GDT) functionality.

In some embodiments, the electrical device can provide a functionality of at least one GDT and at least one MOV connected in series. For example, the at least one GDT can include one GDT and the at least one MOV can include one MOV. The electrical device can further include an electrical connection between the second inner electrode and the second outer electrode, such that the first inner electrode, the sealed chamber, and the second electrode electrically connected to the second outer electrode form the one GDT with the second outer electrode providing an external terminal functionality. The second layer can include an electrically insulating material such as a ceramic material.

In another example, the at least one GDT can include one GDT and the at least one MOV can include a first MOV and a second MOV, with the one GDT being between the first and second MOVs, and the first MOV being associated with the first layer. The second layer can include a metal oxide material such that the second inner electrode, the second layer, and the second outer layer form the second MOV. At least a portion of the interface can include an electrically insulating portion such that the first layer and the second layer are electrically insulated. The electrically insulating portion of the interface can include a sealing layer implemented between the first and second layers. The sealing layer can include, for example, a glass sealing layer.

In some embodiments, the electrical device can further include an emissive coating formed over each inner electrode of the first and second layers.

In some embodiments, each of the first and second layers can define a pocket on the inner surface, such that a perimeter of the inner surface is raised relative to a floor of the pocket. The respective inner electrode can be implemented on the floor of the pocket of each of the first and second layers.

In some embodiments, the interface can include a spacer layer implemented between the first and second layers, and along a perimeter of the first and second layers. The spacer layer can be formed from an electrically insulating material such as a ceramic material.

In some embodiments, the electrical device can further include a first sealing layer implemented between the first layer and the spacer layer, and a second sealing layer implemented between the spacer layer and the second layer.

In some embodiments, each of the first and second layers can be substantially flat, and the first and second layers can define a side wall. In some embodiments, the spacer layer can include an outer lateral edge that is substantially flush with the side wall. In some embodiments, the spacer layer can include an outer lateral edge that extends laterally outward beyond the side wall.

In some embodiments, the first layer can be an approximate mirror image of the second layer about a mid-plane between the first and second layers.

In some embodiments, each of the first layer and the second layer can be substantially free of a piezoelectric material.

In some embodiments, each of the first layer and the second layer can be substantially free of a piezoelectric property.

In some implementations, the present disclosure relates to a method for manufacturing an electrical device. The method includes providing or forming a first layer and a second layer, with each having an outer surface and an inner surface, and the first layer including a metal oxide material. The method further includes forming an inner electrode on the inner surface of each of the first and second layers, and joining the first layer and the second layer with an interface, such that the inner surfaces of the first and second layers define a sealed chamber therebetween. The method further includes forming an outer electrode on the outer surface of each of the first and second layers, such that the first outer electrode, the first layer, and the first inner electrode provide a metal oxide varistor (MOV) functionality, and the first inner electrode, the second inner electrode, and the sealed chamber provide a gas discharge tube (GDT) functionality.

In some embodiments, at least some of the steps can be performed in a discrete format.

In some embodiments, at least some of the steps can be performed in an array format in which a plurality of units are joined in an array, with each unit corresponding to a partially or completely fabricated form of the electrical device. The method can further include singulating the array to produce a plurality of individual units.

In some embodiments, the forming of the outer electrodes on the respective outer surfaces of the first and second layers can be performed substantially at the same time.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Disclosed herein are various examples of devices and methods related to integration of one or more gas discharge tubes (GDTs) with one or more metal oxide varistors (MOVs). For purposes of description, a device having such integration of GDT(s) and MOV(s) can be referred to herein as a GDT/MOV device, or simply as a GDT/MOV.

It is noted that a typical MOV by itself can degrade due to, for example, a constant AC line voltage stress. Such a stress can result from surge history, time, temperature, or some combination thereof, and result in an increase in leakage current, and/or a decrease in effectiveness of the MOV (e.g., maximum continuous operating voltage (MCOV)). The increase in leakage current can negatively impact an energy efficiency rating of the MOV due to an increase in a stand-by current. Also, sustained AC voltage swells can result in overheating of the MOV which in turn can result in failure and/or fire.

When an MOV is combined with a GDT, the resulting combination can be a GDT/MOV device having a GDT and an MOV electrically connected in series. When operating under normal conditions, a line (e.g., an AC line) voltage appears largely across the GDT, thereby effectively disconnecting the MOV from the line. During a surge event, the GDT can switch on relatively quickly, and thereby connect the MOV across the line to clamp the surge voltage to an acceptable level. Once the surge event has passed, the GDT can switch off again and thereby disconnect the MOV as before.

Accordingly, a GDT/MOV device can provide a number of advantageous features. For example, reduced leakage current in the MOV portion can be achieved, which can extend the operating life of the device. In another example, a GDT/MOV device can be designed to provide voltage swell immunity, or reduced sensitivity to such a voltage swell, without sacrificing clamping voltage performance.

Figure 1:
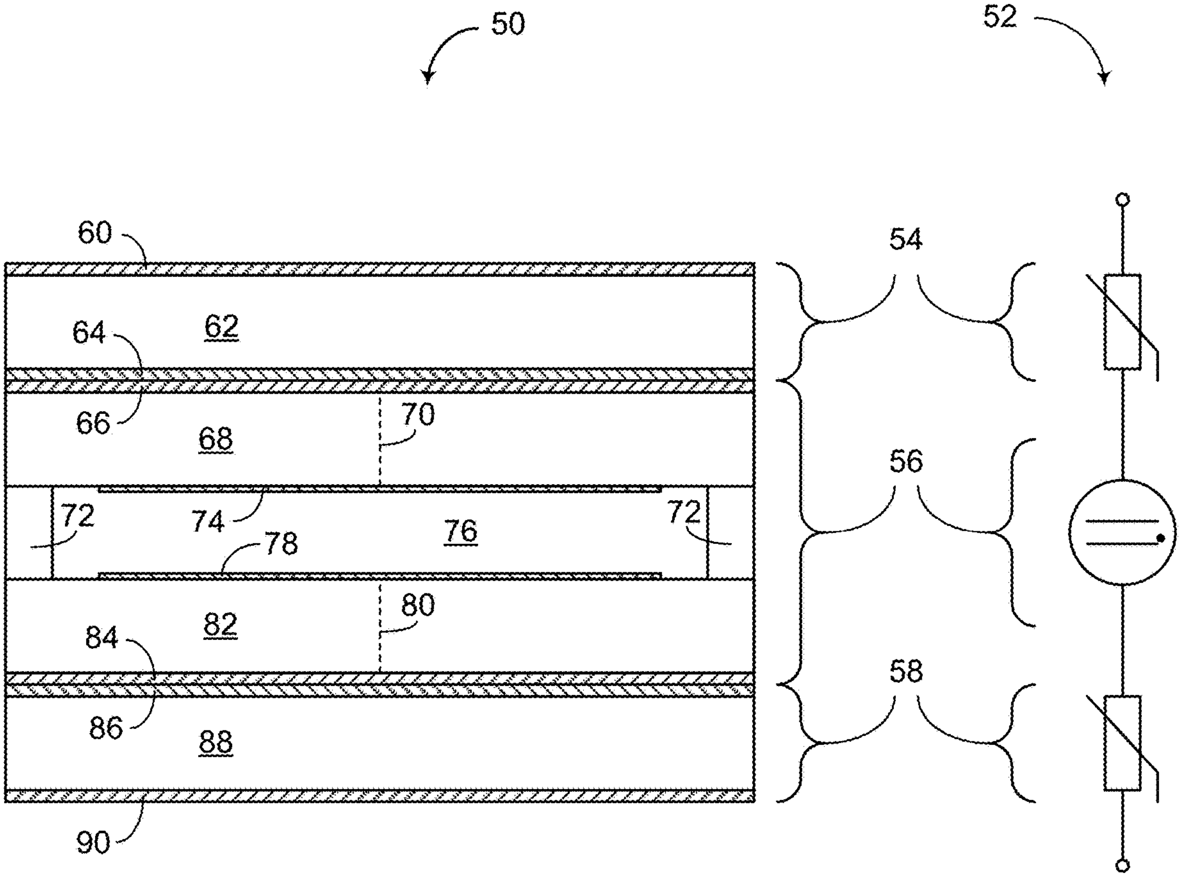
FIG. 1 shows a side sectional view of a device having a combination of a first metal oxide varistor (MOV) device, a gas discharge tube (GDT) device, and a second MOV device, implemented in series.

FIG. 1 shows a side sectional view of a device 50 having a combination of a first MOV device 54, a GDT device 56, and a second MOV device 58, implemented in series. FIG. 1 also shows an electrical circuit representation 52 of the device 50. In the example of FIG. 1, the first MOV device 54 includes its own terminals 60, 64 implemented on opposing sides of a metal oxide layer 62. Similarly, the second MOV device 58 includes its own terminals 86, 90 implemented on opposing sides of a metal oxide layer 88.

Between the first and second MOV devices 54, 58 is the GDT device 56 with its own terminals 66, 84 on opposing sides of the GDT device 56. The GDT device 56 itself is shown to include a middle layer 72 with an opening, and first and second layers 68, 82 on opposing sides of the middle layer 72, so as to form a sealed chamber 76 defined by the opening of the middle layer 72 and inner facing surfaces of the first and second layers 68, 82.

Within the foregoing sealed chamber 76 are first and second electrodes 74, 78 of the GDT device 56. The first electrode 74 is shown to be electrically connected to the first terminal 66 (electrical connection depicted as dashed line 70), and the second electrode 78 is shown to be electrically connected to the second terminal 84 (electrical connection depicted as dashed line 80).

Examples related to the foregoing GDT device 56 can be found in U.S. Pat. No. 10,032,621 titled FLAT GAS DISCHARGE TUBE DEVICES AND METHODS, which is hereby expressly incorporated by reference herein in its entirety, and its disclosure is to be considered part of the specification of the present application. It will be understood that other designs of GDT devices can be utilized in the example of FIG. 1.

In the example of FIG. 1, the second terminal 64 of the first MOV device 54 is in physical contact with the first terminal 66 of the GDT device 56. Similarly, the first terminal 86 of the second MOV device 58 is in physical contact with the second terminal 84 of the GDT device 56. Accordingly, the first terminal 60 of the first MOV device 54 and the second terminal 90 of the second MOV device 58 can be utilized as overall terminals of the device 50.

In the example of FIG. 1, the three layers (72, 68, 82) of the GDT device 56 can be implemented as electrically insulating layers formed from electrically insulating materials, including the examples disclosed in the above-referenced U.S. Pat. No. 10,032,621. It is noted that with use of such insulating materials for the first and second layers 68, 82 in the GDT device 56, the electrical connections 70, 80 are needed to connect the electrodes 74, 78 to their respective terminals (66, 84). Examples of such electrical connections (internal and/or external connections) can also be found in U.S. Pat. No. 10,032,621.

Figure 2:
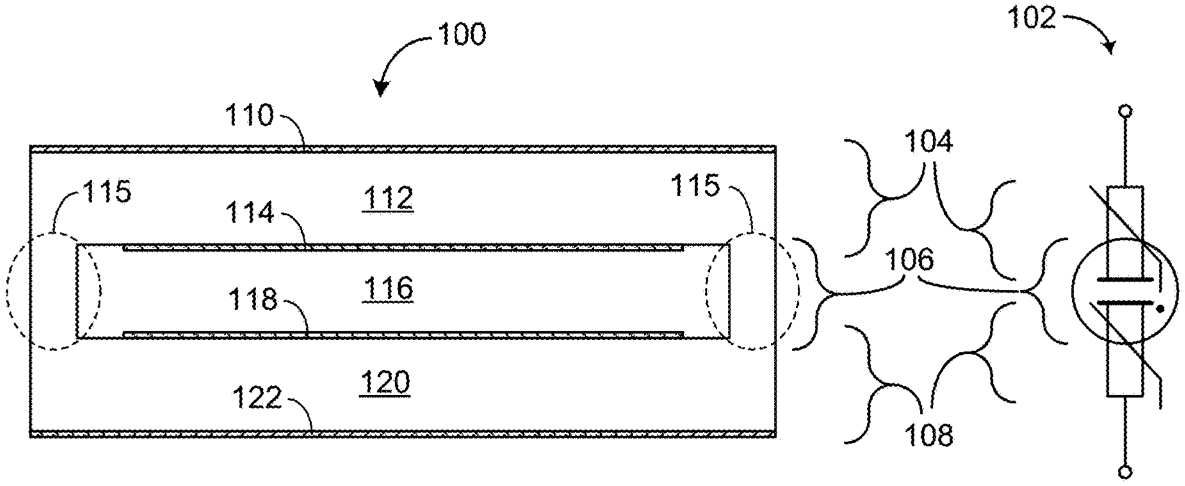
FIG. 2 shows a GDT/MOV device that can provide electrical functionalities similar to the example of FIG. 1, but in which structures and/or fabrication methods can be significantly simplified.

FIG. 2 shows a GDT/MOV device that can provide electrical functionalities similar to the example of FIG. 1, but in which structures and/or fabrication methods can be significantly simplified. FIG. 2 shows that in some embodiments, a GDT/MOV device 100 can include a sealed chamber 116 having opposing sides. A first electrode 114 is shown to be implemented on one of such opposing sides, and a second electrode 118 is shown to be implemented on the other side, thereby providing a GDT configuration 106 (also referred to as a GDT herein).

The first electrode 114 of the GDT 106 is also shown to function as one of two electrodes of a first MOV configuration 104 (also referred to as an MOV herein). More particularly, a metal oxide layer 112 is shown to be implemented between the first electrode 114 of the GDT 106 and a first external electrode 110, thereby providing the first MOV functionality.

Similarly, the second electrode 118 of the GDT 106 is also shown to function as one of two electrodes of a second MOV configuration 108 (also referred to as an MOV herein). More particularly, a metal oxide layer 120 is shown to be implemented between the second electrode 118 of the GDT 106 and a second external electrode 122, thereby providing the second MOV functionality.

In FIG. 2, a circuit representation 102 of the GDT/MOV device 100 is depicted as including a series arrangement of the first MOV 104, the GDT 106, and the second MOV 108. In such a circuit representation, the first MOV 104 is depicted as having one of its electrodes also function as one of the electrodes of the GDT 106. Thus, in the structure shown in FIG. 2, the electrode 114 can be referred to as a first shared electrode. Similarly, the second MOV 108 is depicted as having one of its electrodes also function as the other of the electrodes of the GDT 106. Thus, in the structure shown in FIG. 2, the electrode 118 can be referred to as a second shared electrode.

In the example of FIG. 2, at least some of the layer 112 between the first external electrode 110 and the first shared electrode 114 can include metal oxide material suitable to provide MOV functionality between the electrodes 110, 114. Similarly, at least some of the layer 120 between the second external electrode 122 and the second shared electrode 118 can include metal oxide material suitable to provide MOV functionality between the electrodes 122, 118.

In some embodiments, an edge region (indicated as 115 in FIG. 2) can include an insulating portion to provide electrical insulation between the first metal oxide layer 112 and the second metal oxide layer 120. In some embodiments, the metal oxide material of the first layer 112 may or may not extend into the edge region 115. Similarly, the metal oxide material of the second layer 120 may or may not extend into the edge region 115. Various non-limiting examples of the edge region 115 are described herein in greater details.

In the example of FIG. 2, the GDT/MOV device 100 provides a functionality of two MOVs (104, 108) with a GDT (106) in between, arranged in series. It will be understood that one or more features of the present disclosure can also be implemented with a GDT/MOV device having less than two MOVs.

Figure 3:
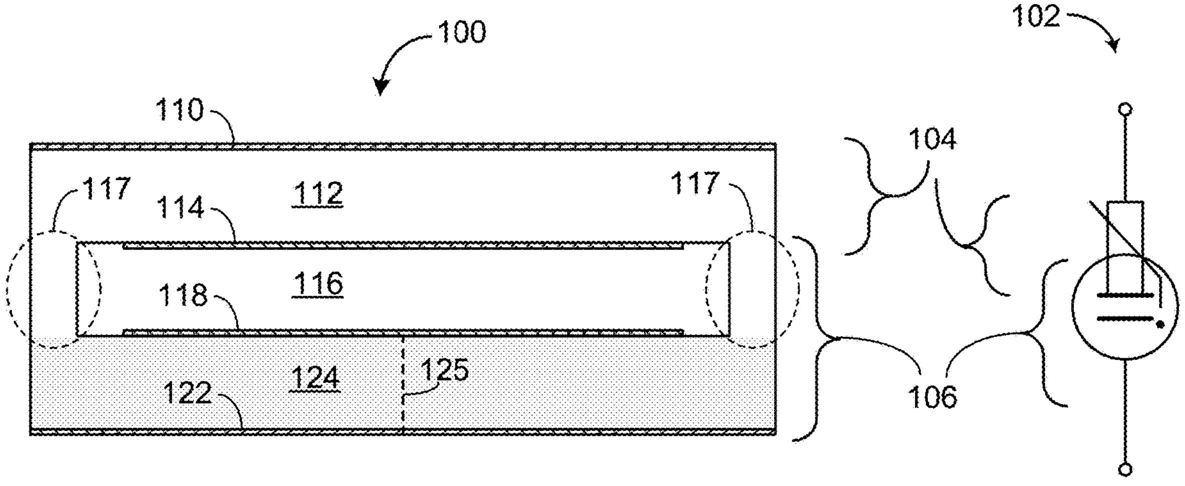
FIG. 3 shows that in some embodiments, a GDT/MOV device can include a sealed chamber having opposing sides, similar to the example of FIG. 2.

For example, FIG. 3 shows that in some embodiments, a GDT/MOV device 100 can include a sealed chamber 116 having opposing sides, similar to the example of FIG. 2. A first electrode 114 is shown to be implemented on one of such opposing sides, and a second electrode 118 is shown to be implemented on the other side, thereby providing a GDT configuration 106.

The first electrode 114 of the GDT 106 is also shown to function as one of two electrodes of an MOV configuration 104. More particularly, a metal oxide layer 112 is shown to be implemented between the first electrode 114 of the GDT 106 and a first external electrode 110, thereby providing the MOV functionality.

Unlike the example of FIG. 2, an electrically insulating layer 124 is shown to be provided between the second electrode 118 of the GDT 106 and a second external electrode 122. Further, the second electrode 118 of the GDT 106 is shown to be electrically connected (depicted as 125) to the second external electrode 122, such that the assembly generally indicated as 106 provides the GDT functionality.

In FIG. 3, a circuit representation 102 of the GDT/MOV device 100 is depicted as including a series arrangement of the MOV 104 and the GDT 106. In such a circuit representation, the MOV 104 is depicted as having one of its electrodes also function as one of the electrodes of the GDT 106. Thus, in the structure shown in FIG. 3, the electrode 114 can be referred to as a shared electrode. Since there is no second MOV in this example, the other electrode (118) of the GDT 106 is not a shared electrode.

In the example of FIG. 3, at least some of the layer 112 between the first external electrode 110 and the shared electrode 114 can include metal oxide material suitable to provide MOV functionality between the electrodes 110, 114. Also in the example of FIG. 3, at least some of the layer 124 between the second external electrode 122 and the second electrode 118 of the GDT 106 can include an electrically insulating material suitable to provide GDT functionality.

In some embodiments, an edge region (indicated as 117 in FIG. 3) can include an insulating material, a metal oxide material, or some combination thereof.

Figure 4:
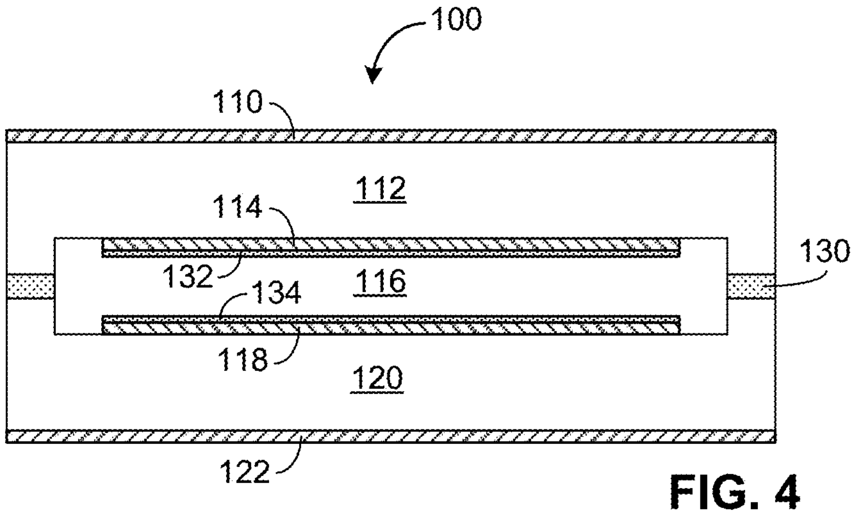
FIG. 4 shows a more specific example of the GDT/MOV device of FIG. 2.

FIG. 4 shows a more specific example of the GDT/MOV device 100 of FIG. 2. More particularly, FIG. 4 shows that in some embodiments, a GDT/MOV device 100 can include a first MOV (104 in FIG. 2) with a metal oxide layer 112 and a second MOV (108 in FIG. 2) with a metal oxide layer 120, with each MOV having a pocket defined by a raised perimeter. Thus, when such MOVs are assembled with the pockets facing each other, a GDT chamber 116 is formed.

As shown in FIG. 4, a seal 130 can be implemented so as to join the raised perimeter portions of the first and second MOVs. In some embodiments, such a seal can be an electrically insulating seal, such as a glass seal. Examples related to formation of glass seals can be found in U.S. patent application Ser. No. 15/990,965 and the corresponding U.S. Publication No. 2019/0074162 titled GLASS SEALED GAS DISCHARGE TUBES, each of which is hereby expressly incorporated by reference herein in its entirety, and its disclosure is to be considered part of the specification of the present application.

In the example of FIG. 4, the first MOV is shown to include an inner electrode 114 on the inner-facing pocket surface of the metal oxide layer 112. The same inner electrode 114 for the first MOV is shown to be utilized as a first electrode of the GDT chamber 116. Similarly, second MOV is shown to include an inner electrode 118 on the inner-facing pocket surface of the metal oxide layer 120. The same inner electrode 118 for the second MOV is shown to be utilized as a second electrode of the GDT chamber 116.

FIG. 4 shows that in some embodiments, an emissive coating (132 or 134) can be provided on each of the electrodes 114, 118. Such an emissive coating can be utilized for operation of the GDT portion of the GDT/MOV device 100. It will be understood that a GDT/MOV device having one or more features as described herein may or may not include emissive coatings on electrodes.

In the example of FIG. 4, first and second outer electrodes 110, 122 are shown to be implemented on the outer sides of the first and second metal oxide layers 112, 120, respectively. Thus, the first MOV can include the first metal oxide layer 112 implemented between the first outer electrode 110 and the first inner electrode 114. Similarly, the second MOV can include the second metal oxide layer 120 implemented between the second outer electrode 122 and the second inner electrode 118.

Figure 5A:
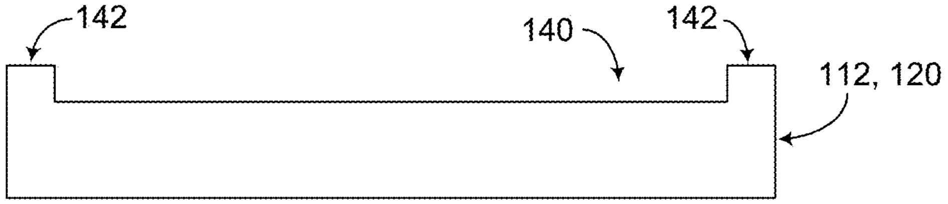
FIGS. 5A-5G show an example process that can be implemented to fabricate the GDT/MOV device of FIG. 4.

FIGS. 5A-5G show various stages of an example process that can be implemented to fabricate the GDT/MOV device 100 of FIG. 4. FIG. 5A shows that in some embodiments, a metal oxide layer can be provided or formed. In some embodiments, such a metal oxide layer can be utilized as the first metal oxide layer 112 or the second metal oxide layer 120 of FIG. 4. Accordingly, the metal oxide layer in FIG. 5A is indicated as 112, 120. However, it will be understood that in some embodiments, a metal oxide layer for the first MOV may be different than a metal oxide layer for the second MOV.

In the example of FIG. 5A, the metal oxide layer 112, 120 is shown to include a pocket 140 defined by a raised perimeter portion 142. In some embodiments, the metal oxide layer 112, 120 can be formed by a molding process or any other process suitable for fabrication of MOVs.

Figure 5B:
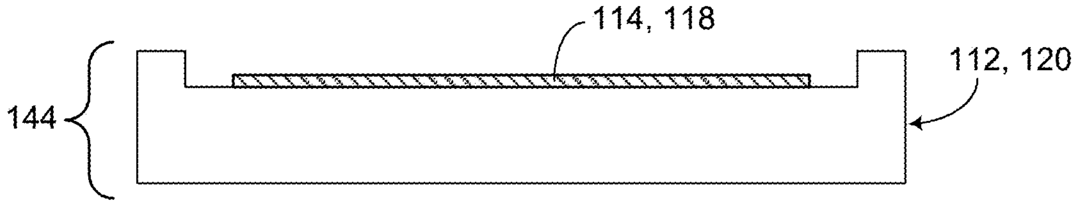

FIG. 5B shows that in some embodiments, an inner electrode (indicated as 114, 118) can be formed on an inner-facing surface (e.g., on the floor) of the pocket (140 in FIG. 5A), so as to form an assembly 144. Thus, in the context of the metal oxide layer 112, 120 being utilized for the first metal oxide layer 112 and the second metal oxide layer 120 of FIG. 4, the same inner electrode (114, 118) can be utilized for the first metal oxide layer 112 and the second metal oxide layer 120. It will be understood that in some embodiments, the first and second inner electrodes may or may not be the same.

Figure 5C:
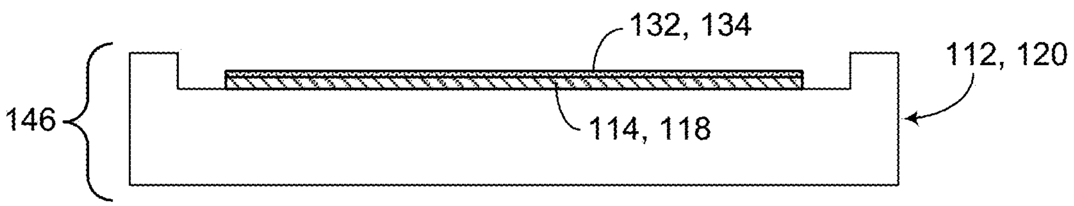

FIG. 5C shows that in some embodiments, an emissive coating (indicated as 132, 134) can be formed on an inner-facing surface of the respective inner electrode (114, 118), so as to form an assembly 146. It will be understood that in some embodiments, emissive coatings for the first and second inner electrodes may or may not be the same.

Figure 5D:
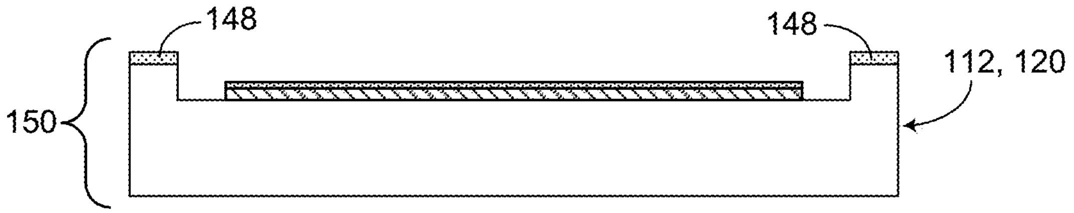

FIG. 5D shows that in some embodiments, a layer 148 of sealing material can be formed on the raised perimeter portion (142 in FIG. 5A), so as to form an assembly 150. In some embodiments, such a sealing material can be an electrically insulating material such as an insulative sealing glass or other high temperature insulative sealing material.

Figure 5E:
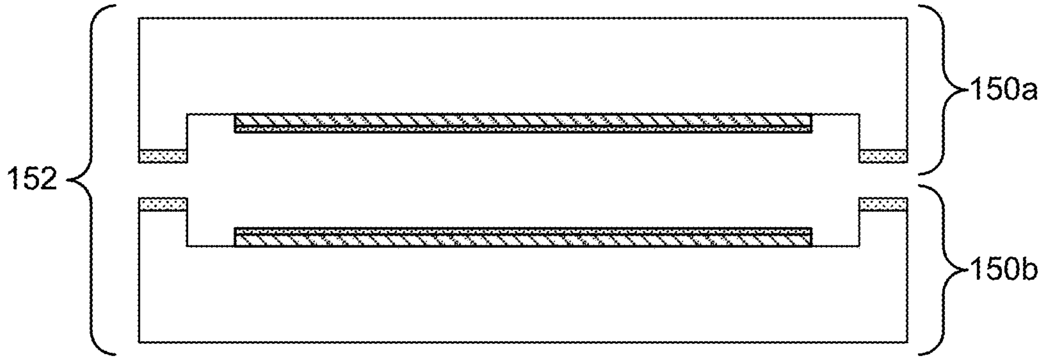

FIG. 5E shows that in some embodiments, two of the assemblies 150 of FIG. 5D can be assembled to allow joining of the inner facing portions of the two assemblies. More particularly, a first assembly 150*a* (similar to the assembly 150 of FIG. 5D) can be inverted and positioned over a second assembly 150*b* (also similar to the assembly 150 of FIG. 5D), so as to form an assembly 152.

Figure 5F:
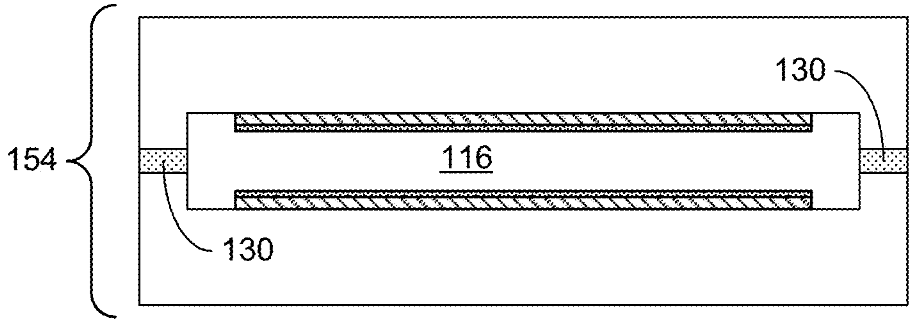

FIG. 5F shows that in some embodiments, the assembly 152 of FIG. 5E can be further processed to form a seal 130 and a corresponding sealed chamber 116, so as to form an assembly 154. By way of an example, such further processing of the assembly 152 of FIG. 5E can include providing a desired gas (e.g., inert gas, active gas, or some combination thereof) so that the unsealed chamber becomes filled with the gas. Then, the assembly 152 can be heated so that the sealing layers (148 in FIG. 5D) fuse to form the seal 130 and the sealed chamber 116 with the desired gas therein.

Figure 5G:
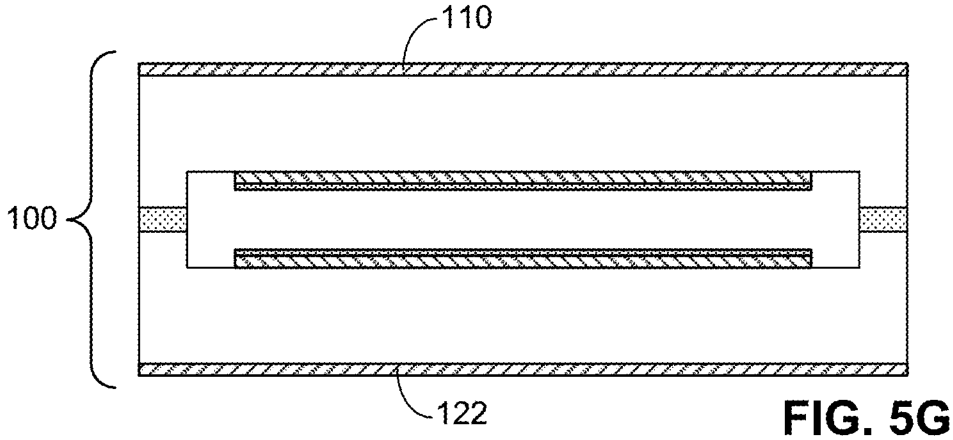

FIG. 5G shows that in some embodiments, first and second external electrodes 110, 122 can be formed on the assembly 154 of FIG. 5F, so as to form an assembly 100 that is similar to the GDT/MOV device 100 of FIG. 4. More particularly, the first external electrode 110 can be formed on the outer facing surface of the first metal oxide layer (112 in FIG. 4), and the second external electrode 122 can be formed on the outer facing surface of the second metal oxide layer (120 in FIG. 4).

In the examples of FIGS. 4 and 5A-5G, the interface portion (115 in FIG. 2) between the two MOVs can include the raised perimeter portions (142 in FIG. 5A). In some embodiments, such raised perimeter portions can be formed from the same metal oxide material that forms the remaining portions of the metal oxide layers (112, 120 in FIG. 4).

It is noted that in the examples of FIGS. 4 and 5A-5G, an electrically insulating property of the interface portion (115 in FIG. 2) between the two MOVs can be provided by the electrically insulating seal 130, as shown in FIGS. 4, 5F and 5G.

Figure 6:
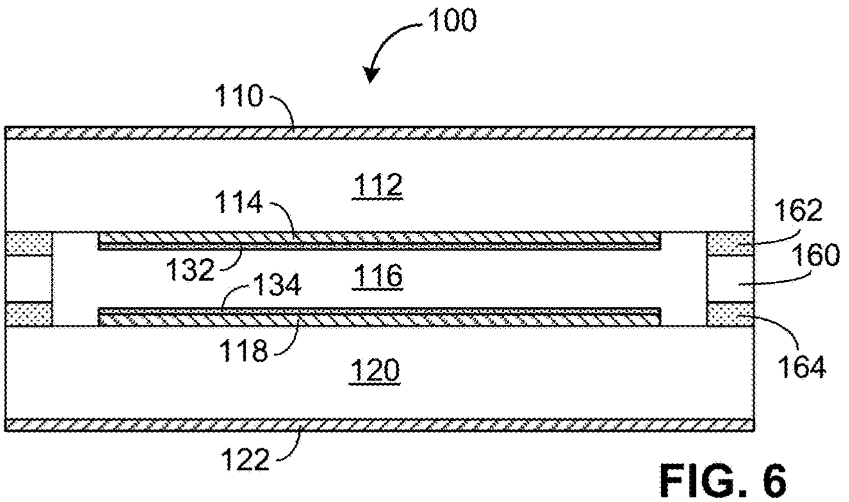
FIG. 6 shows another more specific example of the GDT/MOV device of FIG. 2.

FIG. 6 shows another more specific example of the GDT/MOV device 100 of FIG. 2. More particularly, FIG. 6 shows that in some embodiments, a GDT/MOV device 100 can include a first MOV (104 in FIG. 2) with a metal oxide layer 112 and a second MOV (108 in FIG. 2) with a metal oxide layer 120. In the example of FIG. 6, each of the two metal oxide layers 112, 120 can be a substantially flat layer. Thus, when such MOVs are assembled with a spacer 160 therebetween, a GDT chamber 116 is formed.

In some embodiments, the spacer 160 can be implemented as a plate having an opening therethrough, and such an opening can generally define the side wall of the GDT chamber 116 when sealed.

As shown in FIG. 6, a first seal 162 can be implemented so as to join the perimeter portion of the metal oxide layer 112 of the first MOV and the spacer 160, and a second seal 164 can be implemented so as to join the perimeter portion of the metal oxide layer 120 of the second MOV and the spacer 160.

In the example of FIG. 6, at least one of the first seal 162, the spacer 160, and the second seal 164 can be an electrically insulating part. For example, if the spacer 160 is formed from an electrically insulating material (e.g., ceramic), each of the first and second seals 162, 164 can be formed from an electrically conducting material (e.g., metal) or an electrically insulating material (e.g., glass). In another example, if either or both of the first and second seals 162, 164 is/are formed from an electrically insulating material (e.g., glass), the spacer 162 can be formed from an electrically conducting material (e.g., metal) or an electrically insulating material (e.g., ceramic).

For the purpose of description of FIGS. 6 and 7A-7I, it will be assumed that the spacer 162 is formed from an electrically insulating material such as ceramic, and the first and second seals 162, 164 are formed from an electrically insulating material such as glass or an electrically conducting material such as metal. However, it will be understood that other configurations are also possible, as described above.

In the example of FIG. 6, the first MOV is shown to include an inner electrode 114 on the inner-facing surface of the metal oxide layer 112. The same inner electrode 114 for the first MOV is shown to be utilized as a first electrode of the GDT chamber 116. Similarly, second MOV is shown to include an inner electrode 118 on the inner-facing surface of the metal oxide layer 120. The same inner electrode 118 for the second MOV is shown to be utilized as a second electrode of the GDT chamber 116.

FIG. 6 shows that in some embodiments, an emissive coating (132 or 134) can be provided on each of the electrodes 114, 118. Such an emissive coating can be utilized for operation of the GDT portion of the GDT/MOV device 100. It will be understood that a GDT/MOV device having one or more features as described herein may or may not include emissive coatings on electrodes.

In the example of FIG. 6, first and second outer electrodes 110, 122 are shown to be implemented on the outer sides of the first and second metal oxide layers 112, 120, respectively. Thus, the first MOV can include the first metal oxide layer 112 implemented between the first outer electrode 110 and the first inner electrode 114. Similarly, the second MOV can include the second metal oxide layer 120 implemented between the second outer electrode 122 and the second inner electrode 118.

Figure 7A:
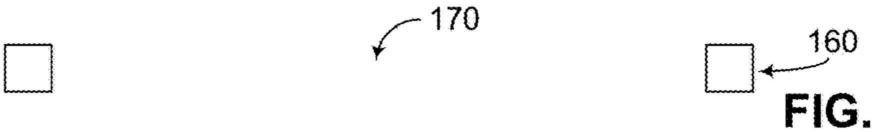
FIGS. 7A-7I show an example process that can be implemented to fabricate the GDT/MOV device of FIG. 6.

FIGS. 7A-7I show various stages of an example process that can be implemented to fabricate the GDT/MOV device 100 of FIG. 6. FIG. 7A shows that in some embodiments, a spacer layer 160 can be provided or formed. Such a spacer layer can include and opening 170 dimensioned to become the chamber of the GDT portion of the GDT/MOV device. In some embodiments, the opening 170 can be formed on a solid layer by, for example, punching or cutting out a desired shape of the opening 170. In some embodiments, the spacer layer 160 can be pre-formed with the opening. In some embodiments, the spacer layer 160 can be formed from, for example, ceramic material.

Figure 7B:

FIG. 7B shows that in some embodiments, a sealing layer 172 can be provided on one side of the perimeter portion of the spacer layer 160, and another sealing layer 174 can be provided on the other side of the perimeter portion of the spacer layer 160, so as to form an assembly 176. In some embodiments, each of the sealing layers 172, 174 can be formed from, for example, an electrically insulating material such as an insulative sealing glass or other high temperature insulative sealing material.

Figure 7C:
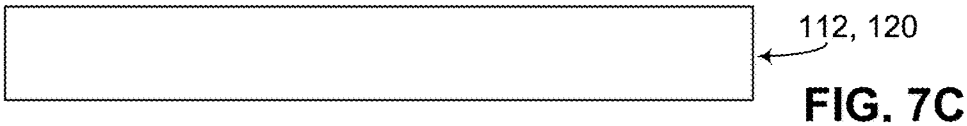

FIG. 7C shows that in some embodiments, a metal oxide layer can be provided or formed. In some embodiments, such a metal oxide layer can be utilized as the first metal oxide layer 112 or the second metal oxide layer 120 of FIG. 6. Accordingly, the metal oxide layer in FIG. 7C is indicated as 112, 120. However, it will be understood that in some embodiments, a metal oxide layer for the first MOV may be different than a metal oxide layer for the second MOV.

FIG. 7C shows that in some embodiments, the metal oxide layer 112, 120 can be substantially flat. In some embodiments, the metal oxide layer 112, 120 can be formed by a molding process or any other process suitable for fabrication of MOVs.

Figure 7D:
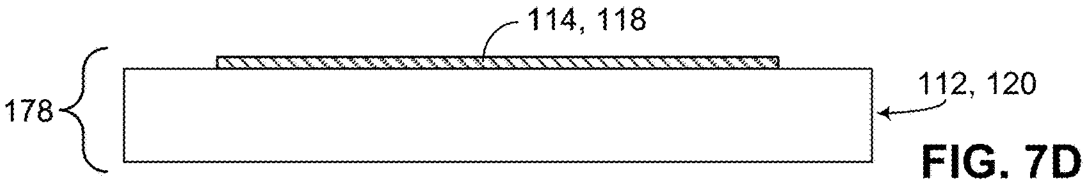

FIG. 7D shows that in some embodiments, an inner electrode (indicated as 114, 118) can be formed on an inner-facing surface of the metal oxide layer 112, 120, so as to form an assembly 178. Thus, in the context of the metal oxide layer 112, 120 being utilized for the first metal oxide layer 112 and the second metal oxide layer 120 of FIG. 6, the same inner electrode (114, 118) can be utilized for the first metal oxide layer 112 and the second metal oxide layer 120. It will be understood that in some embodiments, the first and second inner electrodes may or may not be the same.

Figure 7E:
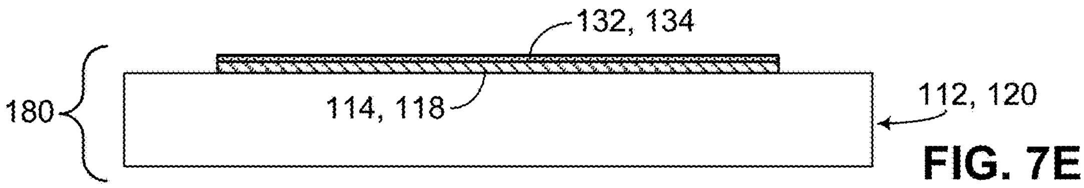

FIG. 7E shows that in some embodiments, an emissive coating (indicated as 132, 134) can be formed on an inner-facing surface of the respective inner electrode (114, 118), so as to form an assembly 180. It will be understood that in some embodiments, emissive coatings for the first and second inner electrodes may or may not be the same.

Figure 7F:
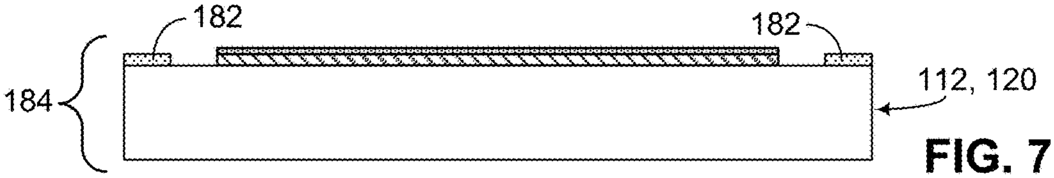

FIG. 7F shows that in some embodiments, a layer 182 of sealing material can be formed on the perimeter portion of the inner-facing surface of the metal oxide layer 112, 120, so as to form an assembly 184. In some embodiments, such a sealing material can be an electrically insulating material such as an insulative sealing glass or other high temperature insulative sealing material.

Figure 7G:
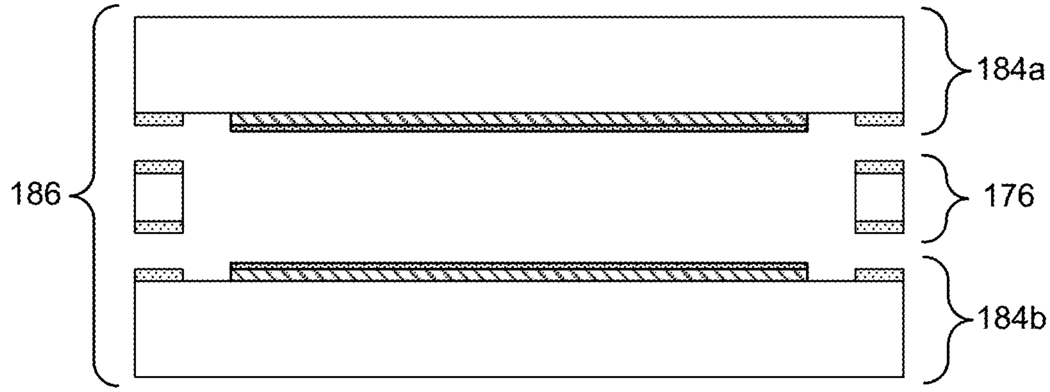

FIG. 7G shows that in some embodiments, two of the assemblies 184 of FIG. 7F and the assembly 176 of FIG. 7B can be assembled to allow joining of the inner facing portions of the two assemblies 184 by the assembly 176. More particularly, a first assembly 184*a* (similar to the assembly 184 of FIG. 7F) can be inverted and positioned over the spacer/sealing layer assembly 176, and a second assembly 184*b* (also similar to the assembly 184 of FIG. 7F) can be positioned under the spacer/sealing layer assembly 176, so as to form an assembly 186.

Figure 7H:
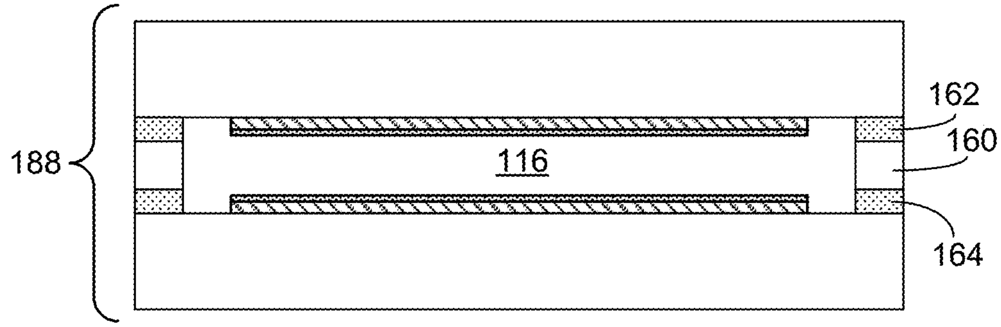

FIG. 7H shows that in some embodiments, the assembly 186 of FIG. 7G can be further processed to form seals 162, 164 on both sides of the spacer layer 160 and a corresponding sealed chamber 116, so as to form an assembly 188. By way of an example, such further processing of the assembly 186 of FIG. 7G can include providing a desired gas (e.g., inert gas, active gas, or some combination thereof) so that the unsealed chamber becomes filled with the gas. Then, the assembly 186 can be heated so that the respective sealing layers (172 and 182, and 174 and 182, in FIGS. 7B and 7F) fuse to form the seals 162, 164 on both sides of the spacer 160 and the sealed chamber 116 with the desired gas therein.

Figure 7I:
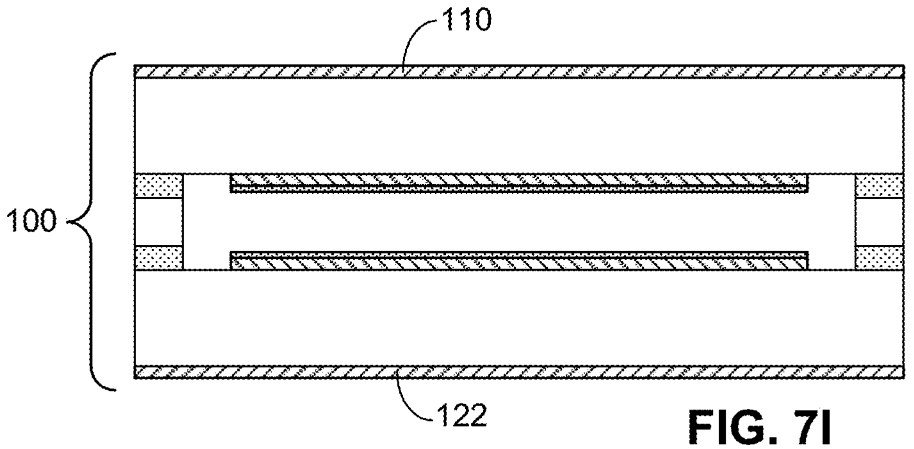

FIG. 7I shows that in some embodiments, first and second external electrodes 110, 122 can be formed on the assembly 188 of FIG. 7H, so as to form an assembly 100 that is similar to the GDT/MOV device 100 of FIG. 6. More particularly, the first external electrode 110 can be formed on the outer facing surface of the first metal oxide layer (112 in FIG. 6), and the second external electrode 122 can be formed on the outer facing surface of the second metal oxide layer (120 in FIG. 6).

Figure 8:
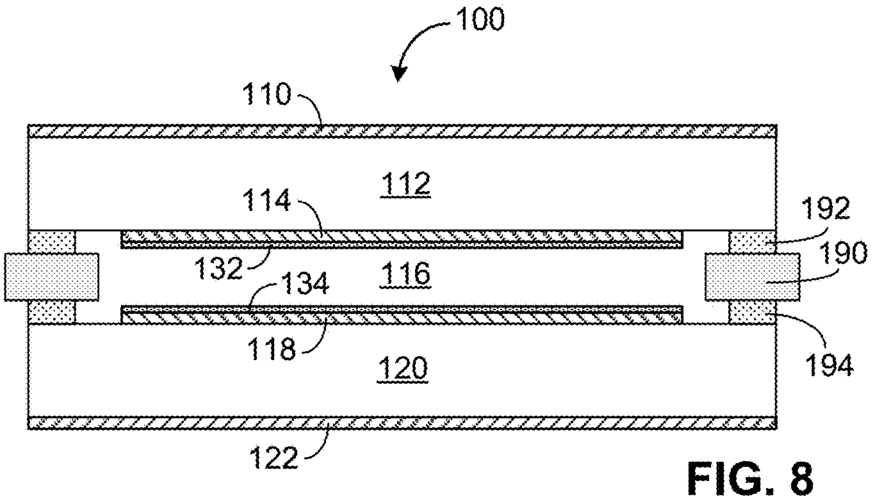
FIG. 8 shows yet another more specific example of the GDT/MOV device of FIG. 2.

FIG. 8 shows yet another more specific example of the GDT/MOV device 100 of FIG. 2. More particularly, FIG. 8 shows that in some embodiments, a GDT/MOV device 100 can include a first MOV (104 in FIG. 2) with a metal oxide layer 112 and a second MOV (108 in FIG. 2) with a metal oxide layer 120. In the example of FIG. 8, each of the two metal oxide layers 112, 120 can be a substantially flat layer, similar to the example of FIG. 6. Thus, when such MOVs are assembled with a spacer 190 therebetween, a GDT chamber 116 is formed.

In some embodiments, the spacer 190 can be implemented as a plate having an opening therethrough, similar to the example spacer 160 of FIG. 6. In the example of FIG. 8, however, the spacer 190 is shown to be dimensioned so that its lateral outer portion extends beyond an outer side wall defined by the first and second metal oxide layers 112, 120. As described herein, the foregoing extension of the spacer can be referred to as a "wing." Examples related to such wings can be found in U.S. Pat. No. 9,202,682 titled DEVICES AND METHODS RELATED TO FLAT GAS DISCHARGE TUBES, which is hereby expressly incorporated by reference herein in its entirety, and its disclosure is to be considered part of the specification of the present application.

As also described herein, and in some embodiments, such a wing configuration can allow multiple GDT/MOV devices to be fabricated in an array format and be singulated in a manner that is different than a singulation technique that may be utilized after an array-format fabrication of multiple GDT/MOV devices similar to the example of FIG. 6. Examples of such array-format fabrications are described herein in greater detail. In some embodiments, the lateral inner portion of the spacer 190 may or may not extend inward beyond the inner edge of seals 192, 194 on both sides of the spacer 190.

As shown in FIG. 8, a first seal 192 can be implemented so as to join the perimeter portion of the metal oxide layer 112 of the first MOV and the spacer 190, and a second seal 194 can be implemented so as to join the perimeter portion of the metal oxide layer 120 of the second MOV and the spacer 190.

In the example of FIG. 8, at least one of the first seal 192, the spacer 190, and the second seal 194 can be an electrically insulating part. For example, if the spacer 190 is formed from an electrically insulating material (e.g., ceramic), each of the first and second seals 192, 194 can be formed from an electrically conducting material (e.g., metal) or an electrically insulating material (e.g., glass). In another example, if either or both of the first and second seals 192, 194 is/are formed from an electrically insulating material (e.g., glass), the spacer 192 can be formed from an electrically conducting material (e.g., metal) or an electrically insulating material (e.g., ceramic).

For the purpose of description of FIGS. 8 and 9A-9I, it will be assumed that the spacer 192 is formed from an electrically insulating material such as ceramic, and the first and second seals 192, 194 are formed from an electrically insulating material such as glass or an electrically conducting material such as metal. However, it will be understood that other configurations are also possible, as described above.

In the example of FIG. 8, the first MOV is shown to include an inner electrode 114 on the inner-facing surface of the metal oxide layer 112. The same inner electrode 114 for the first MOV is shown to be utilized as a first electrode of the GDT chamber 116. Similarly, second MOV is shown to include an inner electrode 118 on the inner-facing surface of the metal oxide layer 120. The same inner electrode 118 for the second MOV is shown to be utilized as a second electrode of the GDT chamber 116.

FIG. 8 shows that in some embodiments, an emissive coating can be provided on each of the electrodes 114, 118. Such an emissive coating can be utilized for operation of the GDT portion of the GDT/MOV device 100. It will be understood that a GDT/MOV device having one or more features as described herein may or may not include emissive coatings on electrodes.

In the example of FIG. 8, first and second outer electrodes 110, 122 are shown to be implemented on the outer sides of the first and second metal oxide layers 112, 120, respectively. Thus, the first MOV can include the first metal oxide layer 112 implemented between the first outer electrode 110 and the first inner electrode 114. Similarly, the second MOV can include the second metal oxide layer 120 implemented between the second outer electrode 122 and the second inner electrode 118.

Figure 9A:
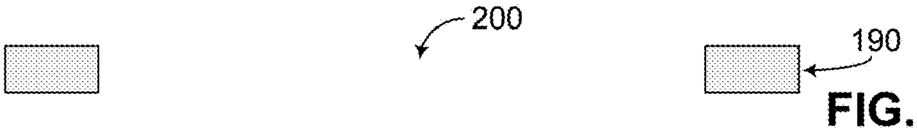
FIGS. 9A-9I show an example process that can be implemented to fabricate the GDT/MOV device of FIG. 8.

FIGS. 9A-9I show various stages of an example process that can be implemented to fabricate the GDT/MOV device 100 of FIG. 8. FIG. 9A shows that in some embodiments, a spacer layer 190 can be provided or formed. Such a spacer layer can include and opening 200 dimensioned to generally become the chamber of the GDT portion of the GDT/MOV device. In some embodiments, the opening 200 can be formed on a solid layer by, for example, punching or cutting out a desired shape of the opening 200. In some embodiments, the spacer layer 190 can be pre-formed with the opening. In some embodiments, the spacer layer 190 can be formed from, for example, ceramic material.

Figure 9B:

FIG. 9B shows that in some embodiments, a sealing layer 202 can be provided on one side of the near-perimeter portion of the spacer layer 190, and another sealing layer 204 can be provided on the other side of the near-perimeter portion of the spacer layer 190, so as to form an assembly 206. In some embodiments, the sealing layers 202, 204 can be positioned inward from the outer edge of the spacer layer 190 so as to allow formation of the wing, where the outer portion of the spacer layer 190 extends outward beyond the side wall defined by the first and second metal oxide layers 112, 120. In some embodiments, each of the sealing layers 202, 204 can be formed from, for example, an electrically insulating material such as an insulative sealing glass or other high temperature insulative sealing material.

Figure 9C:
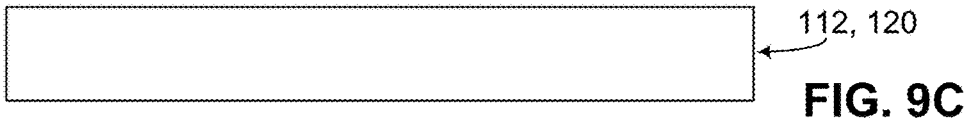

FIG. 9C shows that in some embodiments, a metal oxide layer can be provided or formed. In some embodiments, such a metal oxide layer can be utilized as the first metal oxide layer 112 or the second metal oxide layer 120 of FIG. 8. Accordingly, the metal oxide layer in FIG. 9C is indicated as 112, 120. However, it will be understood that in some embodiments, a metal oxide layer for the first MOV may be different than a metal oxide layer for the second MOV.

FIG. 9C shows that in some embodiments, the metal oxide layer 112, 120 can be substantially flat. In some embodiments, the metal oxide layer 112, 120 can be formed by a molding process or any other process suitable for fabrication of MOVs.

Figure 9D:
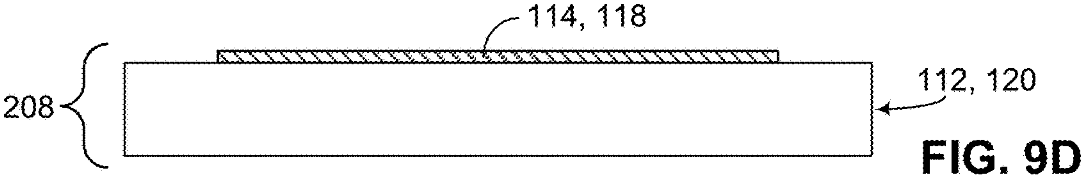

FIG. 9D shows that in some embodiments, an inner electrode (indicated as 114, 118) can be formed on an inner-facing surface of the metal oxide layer 112, 120, so as to form an assembly 208. Thus, in the context of the metal oxide layer 112, 120 being utilized for the first metal oxide layer 112 and the second metal oxide layer 120 of FIG. 8, the same inner electrode (114, 118) can be utilized for the first metal oxide layer 112 and the second metal oxide layer 120. It will be understood that in some embodiments, the first and second inner electrodes may or may not be the same.

Figure 9E:
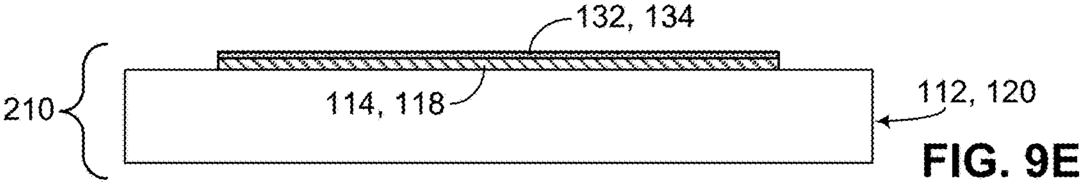

FIG. 9E shows that in some embodiments, an emissive coating (indicated as 132, 134) can be formed on an inner-facing surface of the respective inner electrode (114, 118), so as to form an assembly 210. It will be understood that in some embodiments, emissive coatings for the first and second inner electrodes may or may not be the same.

Figure 9F:
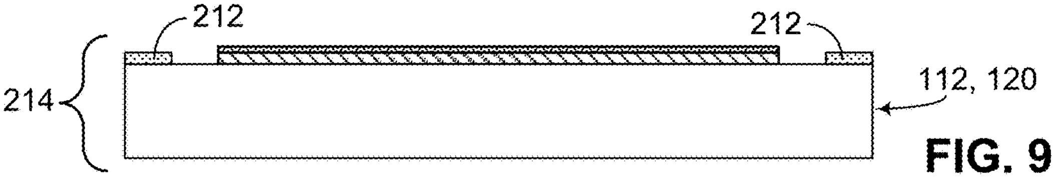

FIG. 9F shows that in some embodiments, a layer 212 of sealing material can be formed on the perimeter portion of the inner-facing surface of the metal oxide layer 112, 120, so as to form an assembly 214. In some embodiments, such a sealing material can be an electrically insulating material such as an insulative sealing glass or other high temperature insulative sealing material.

Figure 9G:
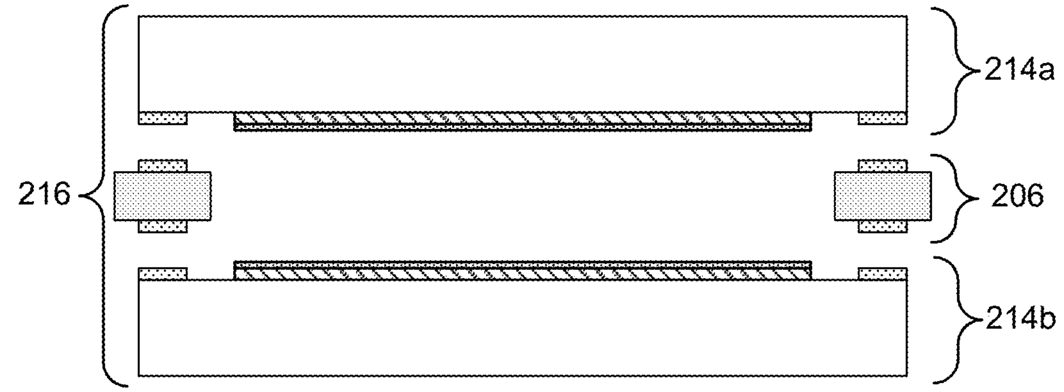

FIG. 9G shows that in some embodiments, two of the assemblies 214 of FIG. 9F and the assembly 206 of FIG. 9B can be assembled to allow joining of the inner facing portions of the two assemblies 214 by the assembly 206. More particularly, a first assembly 214*a* (similar to the assembly 214 of FIG. 9F) can be inverted and positioned over the spacer/sealing layer assembly 206, and a second assembly 214*b* (also similar to the assembly 214 of FIG. 9F) can be positioned under the spacer/sealing layer assembly 206, so as to form an assembly 216.

Figure 9H:
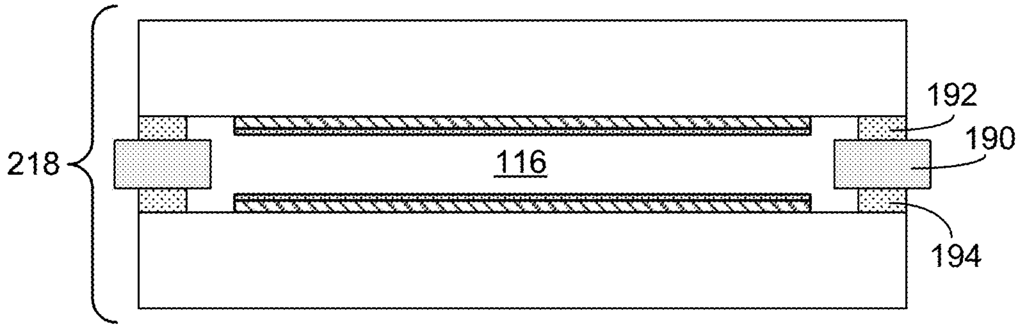

FIG. 9H shows that in some embodiments, the assembly 216 of FIG. 9G can be further processed to form seals 192, 194 on both sides of the spacer layer 190 and a corresponding sealed chamber 116, so as to form an assembly 218. By way of an example, such further processing of the assembly 216 of FIG. 9G can include providing a desired gas (e.g., inert gas, active gas, or some combination thereof) so that the unsealed chamber becomes filled with the gas. Then, the assembly 216 can be heated so that the respective sealing layers (202 and 212, and 204 and 212, in FIGS. 9B and 9F) fuse to form the seals 192, 194 on both sides of the spacer 190 and the sealed chamber 116 with the desired gas therein.

Figure 9I:
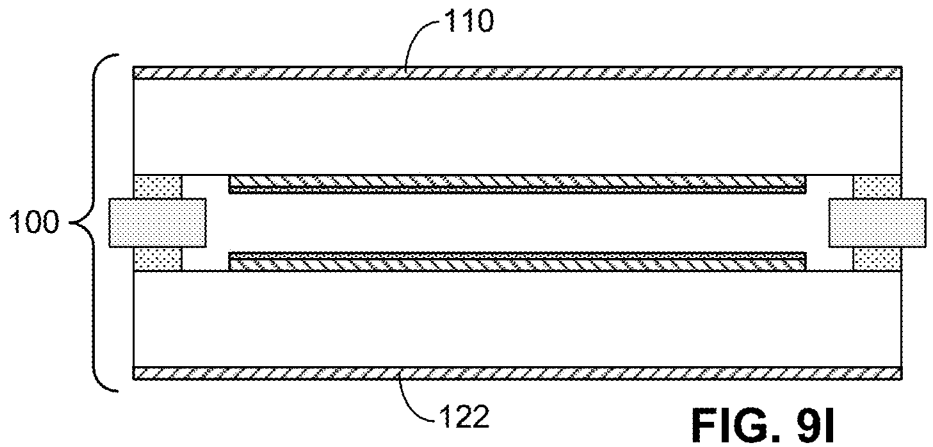

FIG. 9I shows that in some embodiments, first and second external electrodes 110, 122 can be formed on the assembly 218 of FIG. 9H, so as to form an assembly 100 that is similar to the GDT/MOV device 100 of FIG. 8. More particularly, the first external electrode 110 can be formed on the outer facing surface of the first metal oxide layer (112 in FIG. 8), and the second external electrode 122 can be formed on the outer facing surface of the second metal oxide layer (120 in FIG. 8).

Figure 10:
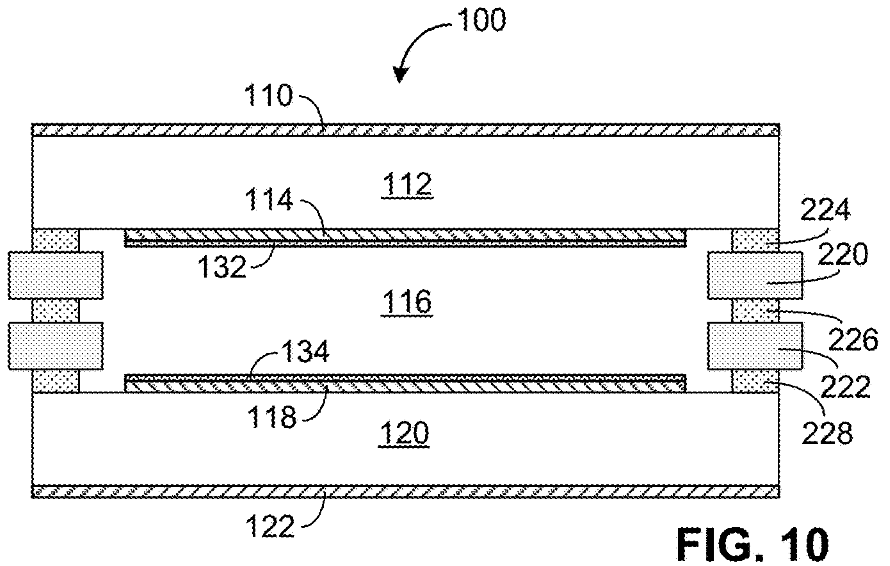
FIG. 10 shows yet another more specific example of the GDT/MOV device of FIG. 2.

FIG. 10 shows yet another more specific example of the GDT/MOV device 100 of FIG. 2. More particularly, FIG. 10 shows that in some embodiments, a GDT/MOV device 100 can be similar to the example of FIG. 8, but include a plurality of spacer layers (e.g., two spacer layers 220, 222). Thus, the GDT/MOV device 100 of FIG. 10 can include a first MOV (104 in FIG. 2) with a metal oxide layer 112 and a second MOV (108 in FIG. 2) with a metal oxide layer 120. In the example of FIG. 10, each of the two metal oxide layers 112, 120 can be a substantially flat layer, similar to the example of FIG. 6. Thus, when such MOVs are assembled with the spacers 220, 222 therebetween, a GDT chamber 116 is formed.

In the example of FIG. 10, each of the spacers 220, 222 can be implemented as a plate having an opening therethrough, similar to the example spacer layer 190 of FIG. 8. With such spacers (220, 222), a seal 224 can be implemented so as to join the perimeter portion of the metal oxide layer 112 of the first MOV and the spacer 220, a seal 226 can be implemented so as to join the spacer 220 and the spacer 222, and seal 228 can be implemented so as to join the perimeter portion of the metal oxide layer 120 of the second MOV and the spacer 222.

In the example of FIG. 10, assuming that each of the two spacers 220, 222 is similar to the spacer 190 of FIG. 8, the additional spacer can allow the GDT portion of the GDT/MOV device 100 to support higher voltages. Thus, it will be understood that more than two of such spacers can also be utilized.

In the example of FIG. 10, first and second inner electrodes 114, 118, optional emissive coatings 132, 134, and first and second outer electrodes 110, 122 can be similar to the example of FIG. 8. However, it will be understood that such parts may also be different to, for example, support higher voltages.

FIGS. 11A-11E show various stages of an example process that can be implemented to fabricate the GDT/MOV device 100 of FIG. 10. Assuming that each of the spacers 220, 222 of FIG. 10 is similar to the spacer 190 of FIG. 8, two of the assemblies 206 of FIG. 9B can be provided in FIG. 11A. Similarly, in FIG. 11B, an assembly 214 of FIG. 9F can be provided for each of the two metal oxide layers 112, 120.

Figure 11A:
FIGS. 11A-11E show an example process that can be implemented to fabricate the GDT/MOV device of FIG. 10.
Figure 11B:
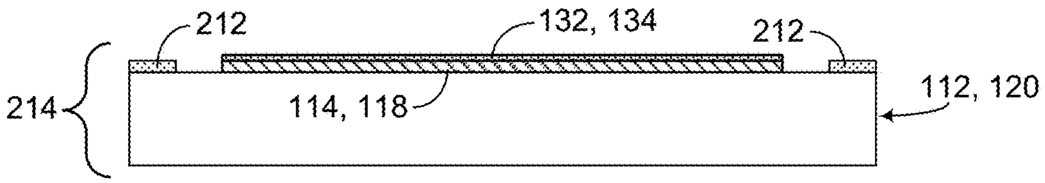
Figure 11C:
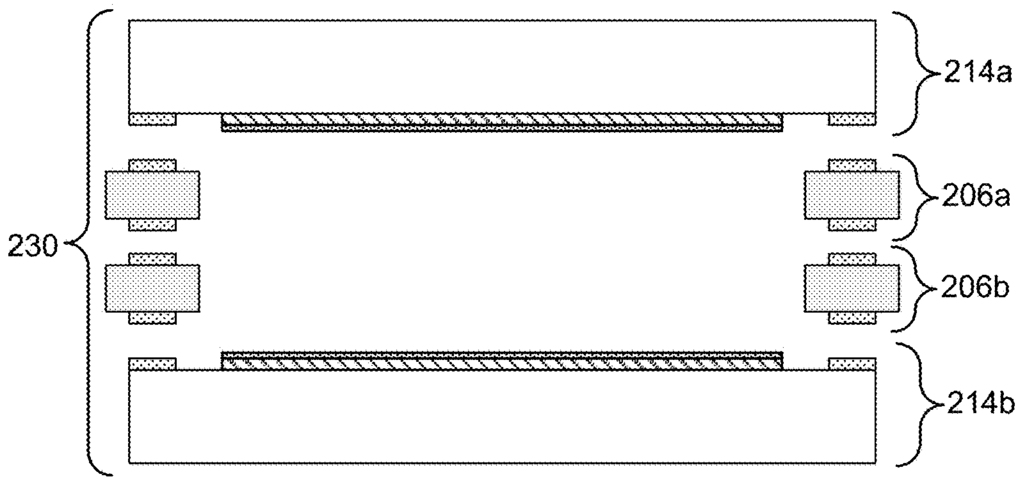

FIG. 11C shows that in some embodiments, two of the assemblies 214 of FIG. 11B and two of the assemblies 206 of FIG. 11B can be assembled to allow joining of the inner facing portions of the two assemblies 214 by the two-spacer assembly. More particularly, a first assembly 214*a* (similar to the assembly 214 of FIG. 11B) can be inverted and positioned over a first spacer/sealing layer assembly 206*a*, which is in turn positioned over a second spacer/sealing layer assembly 206*b*. A second assembly 214*b* (also similar to the assembly 214 of FIG. 11B) can be positioned under the second spacer/sealing layer assembly 206*b*, so as to form an assembly 230.

Figure 11D:
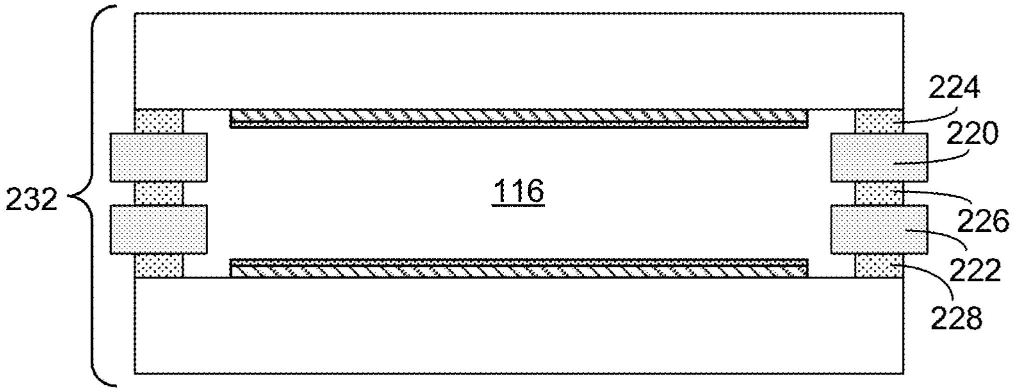

FIG. 11D shows that in some embodiments, the assembly 230 of FIG. 11C can be further processed to form seals 224, 226, 228 between the respective layers, so as to form an assembly 232. By way of an example, such further processing of the assembly 230 of FIG. 11C can include providing a desired gas (e.g., inert gas, active gas, or some combination thereof) so that the unsealed chamber becomes filled with the gas. Then, the assembly 230 can be heated so that the respective sealing layers (202, 204, 212 of FIGS. 11A and 11B) fuse to form the seals 224, 226, 228 between the respective layers and the sealed chamber 116 with the desired gas therein.

Figure 11E:
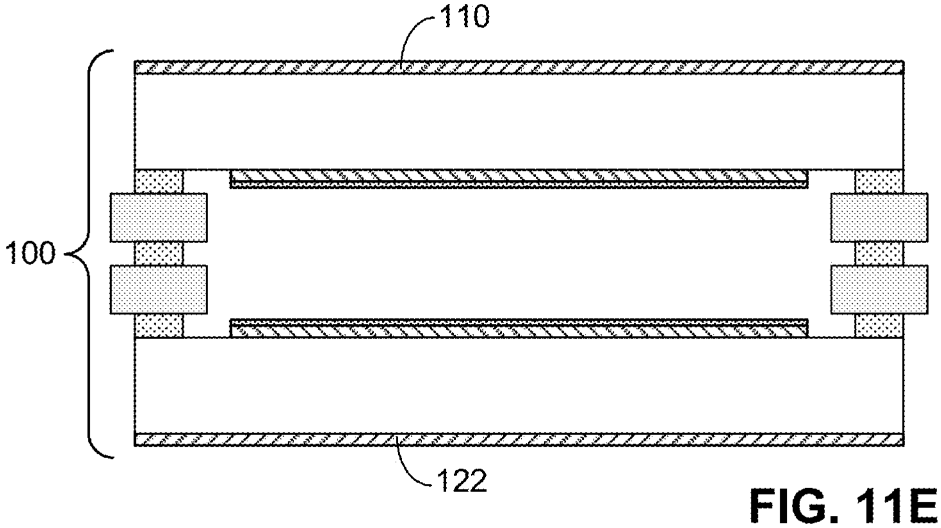

FIG. 11E shows that in some embodiments, first and second external electrodes 110, 122 can be formed on the assembly 232 of FIG. 11D, so as to form an assembly 100 that is similar to the GDT/MOV device 100 of FIG. 10. More particularly, the first external electrode 110 can be formed on the outer facing surface of the first metal oxide layer (112 in FIG. 10), and the second external electrode 122 can be formed on the outer facing surface of the second metal oxide layer (120 in FIG. 10).

In the examples described in reference to FIGS. 4-11, the respective GDT/MOV devices 100 are depicted as being fabricated as single units. It will be understood that in some embodiments, some or all of such GDT/MOV devices can be fabricated in discrete units (e.g., as single units), in array formats, or any combination thereof.

For example, FIGS. 12A-12H show various stages of a fabrication process in which GDT/MOV devices (similar to the GDT/MOV device 100 of FIG. 4) are fabricated in an array format. In another example, FIGS. 13A-13J show various stages of a fabrication process in which GDT/MOV devices (similar to the GDT/MOV device 100 of FIG. 6) are fabricated in an array format. In yet another example, FIGS. 14A-14F show various stages of a fabrication process in which GDT/MOV devices (similar to the GDT/MOV device 100 of FIG. 8) are fabricated in an array format.

Figures 12A, 12B, 12C, 12D:
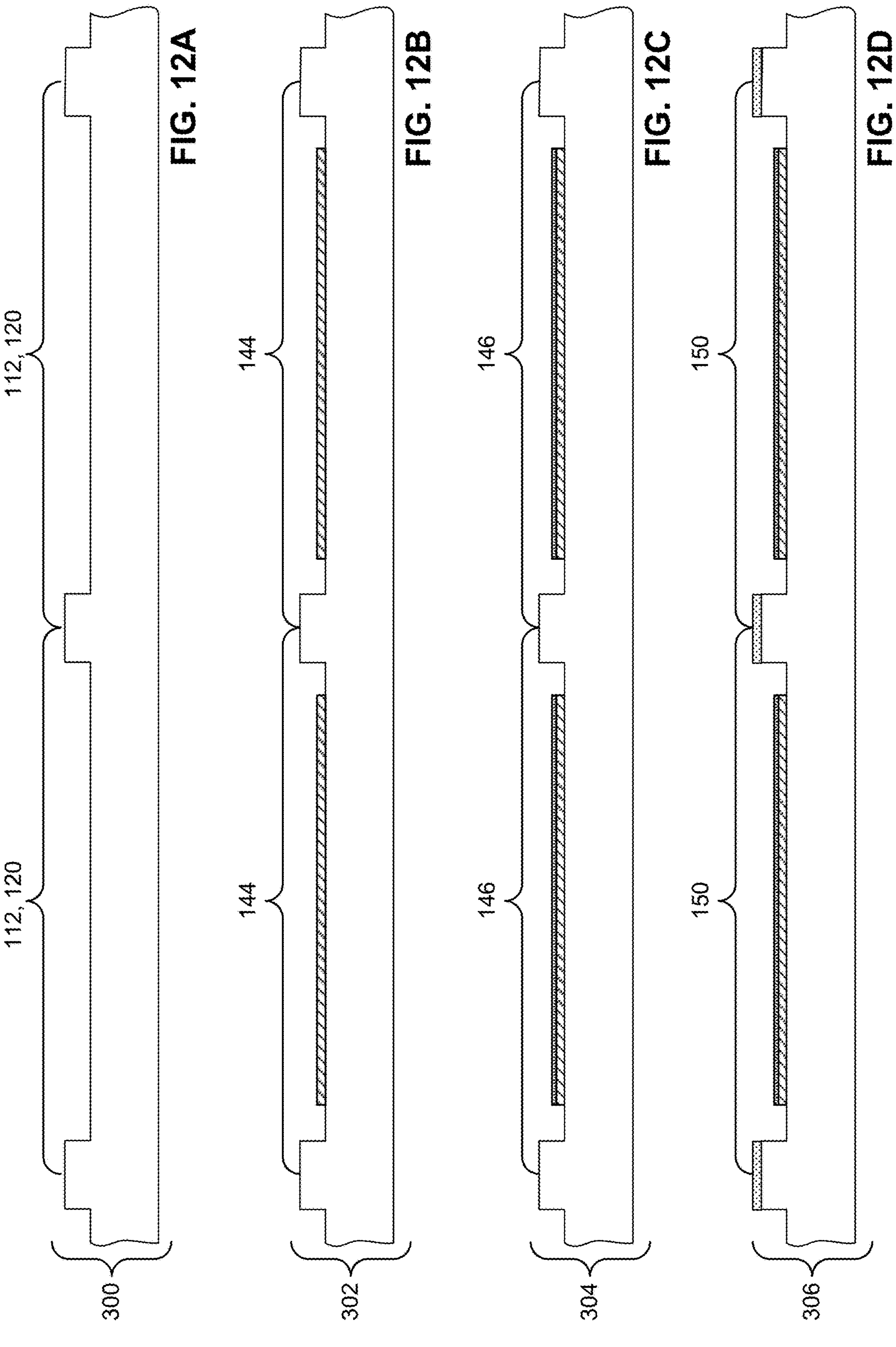
FIGS. 12A-12H show various stages of a fabrication process in which GDT/MOV devices similar to the GDT/MOV device of FIG. 4 can be fabricated in an array format.

Referring to FIG. 12A, an array 300 having a plurality of units (each unit indicated as 112, 120) can be provided or formed. Each unit can be similar to the metal oxide layer 112, 120 of FIG. 5A; thus, the array 300 of FIG. 12A can be an array of first metal oxide units 112, or an array of second metal oxide units 120. Accordingly, the array 300 can be formed in an array format, where each unit is formed similar to the example of FIG. 5A.

Referring to FIG. 12B, the array 300 of FIG. 12A can be processed so as to yield a plurality of units 144, with each unit being similar to the example assembly 144 of FIG. 5B. Accordingly, an assembly 302 can be formed in an array format, where each unit is formed similar to the example of FIG. 5B.

Referring to FIG. 12C, the assembly 302 of FIG. 12B can be processed so as to yield a plurality of units 146, with each unit being similar to the example assembly 146 of FIG. 5C. Accordingly, an assembly 304 can be formed in an array format, where each unit is formed similar to the example of FIG. 5C.

Referring to FIG. 12D, the assembly 304 of FIG. 12C can be processed so as to yield a plurality of units 150, with each unit being similar to the example assembly 150 of FIG. 5D. Accordingly, an assembly 306 can be formed in an array format, where each unit is formed similar to the example of FIG. 5D.

Figure 12E:
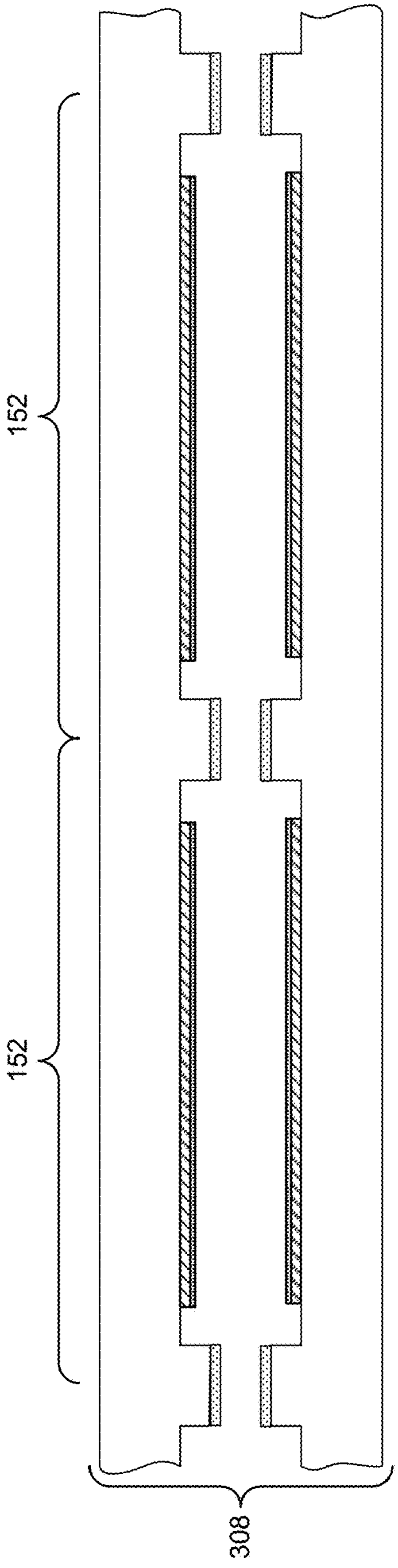

Referring to FIG. 12E, two of the assemblies 306 of FIG. 12D can be processed so as to yield a plurality of units 152, with each unit being similar to the example assembly 152 of FIG. 5E. Accordingly, an assembly 308 can be formed in an array format, where each unit is arranged similar to the example of FIG. 5E.

Figure 12F:
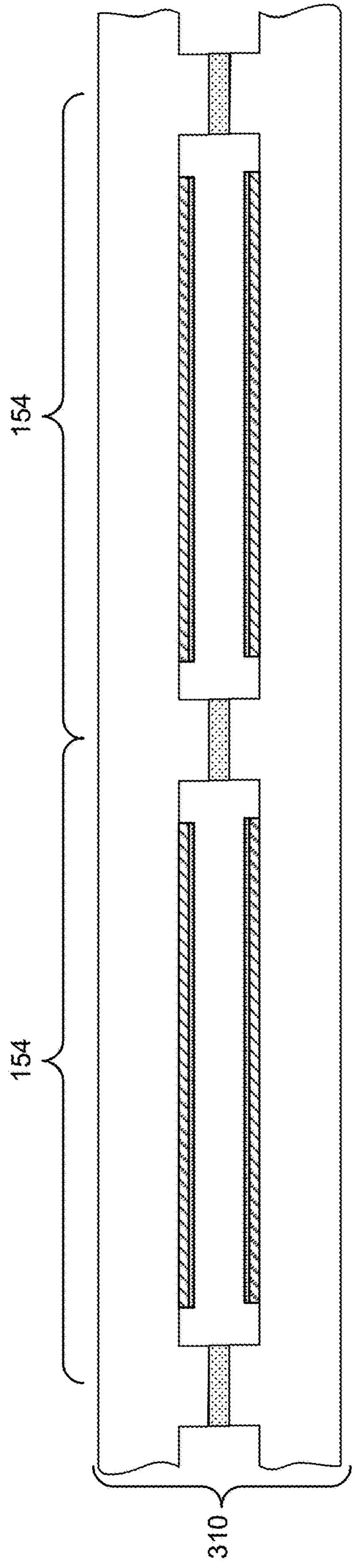

Referring to FIG. 12F, the assembly 308 of FIG. 12E can be processed so as to yield a plurality of units 154, with each unit being similar to the example assembly 154 of FIG. 5F. Accordingly, an assembly 310 can be formed in an array format, where each unit is formed similar to the example of FIG. 5F.

Figure 12G:
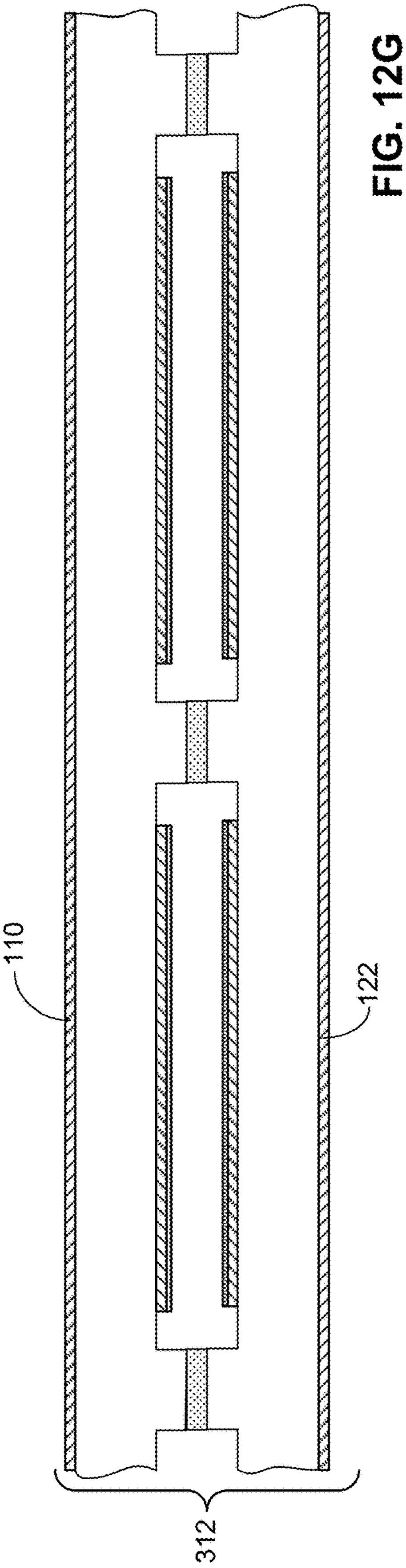

Referring to FIG. 12G, the assembly 310 of FIG. 12F can be processed so as to yield an assembly 312 that includes a plurality of joined units, with each unit being similar to the example assembly of FIG. 5G. Accordingly, an assembly 312 can be formed in an array format, where each unit is formed similar to the example of FIG. 5G.

Figure 12H:
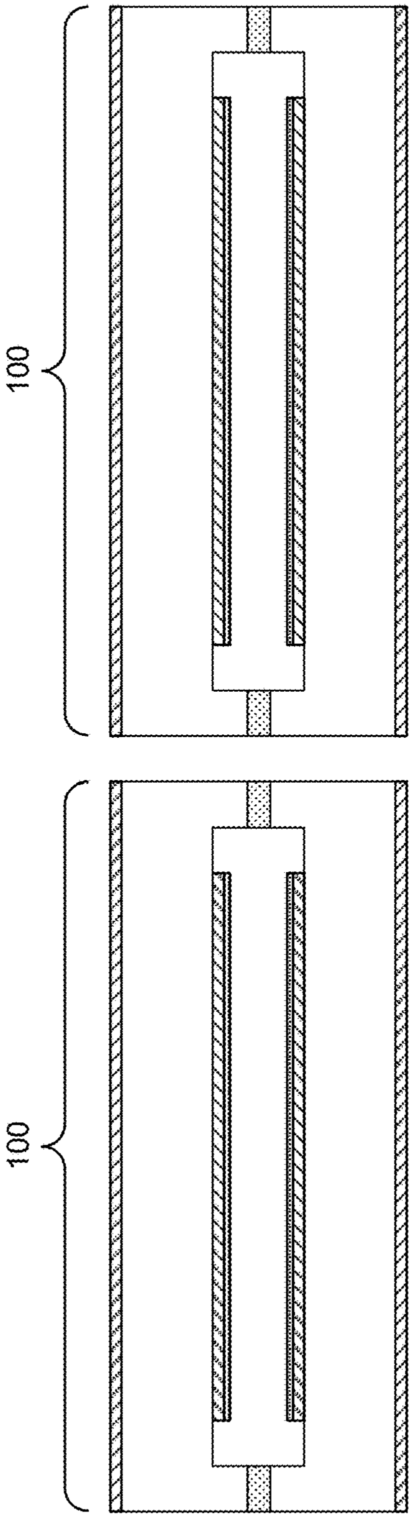

Referring to FIG. 12H, the assembly 312 of FIG. 12G can be processed so as to yield a plurality of individual units 100, with each unit being similar to the GDT/MOV device 100 of FIG. 5G. In some embodiments, such individual units can be obtained by singulation of the array-format assembly 312 of FIG. 12G. In some embodiments, such singulation process can include, for example, a cutting (e.g., saw cutting, blade cutting, laser cutting, etc.) process in which the entire stack assembly between two units is cut.

Figures 13A, 13B, 13C, 13D, 13E, 13F:
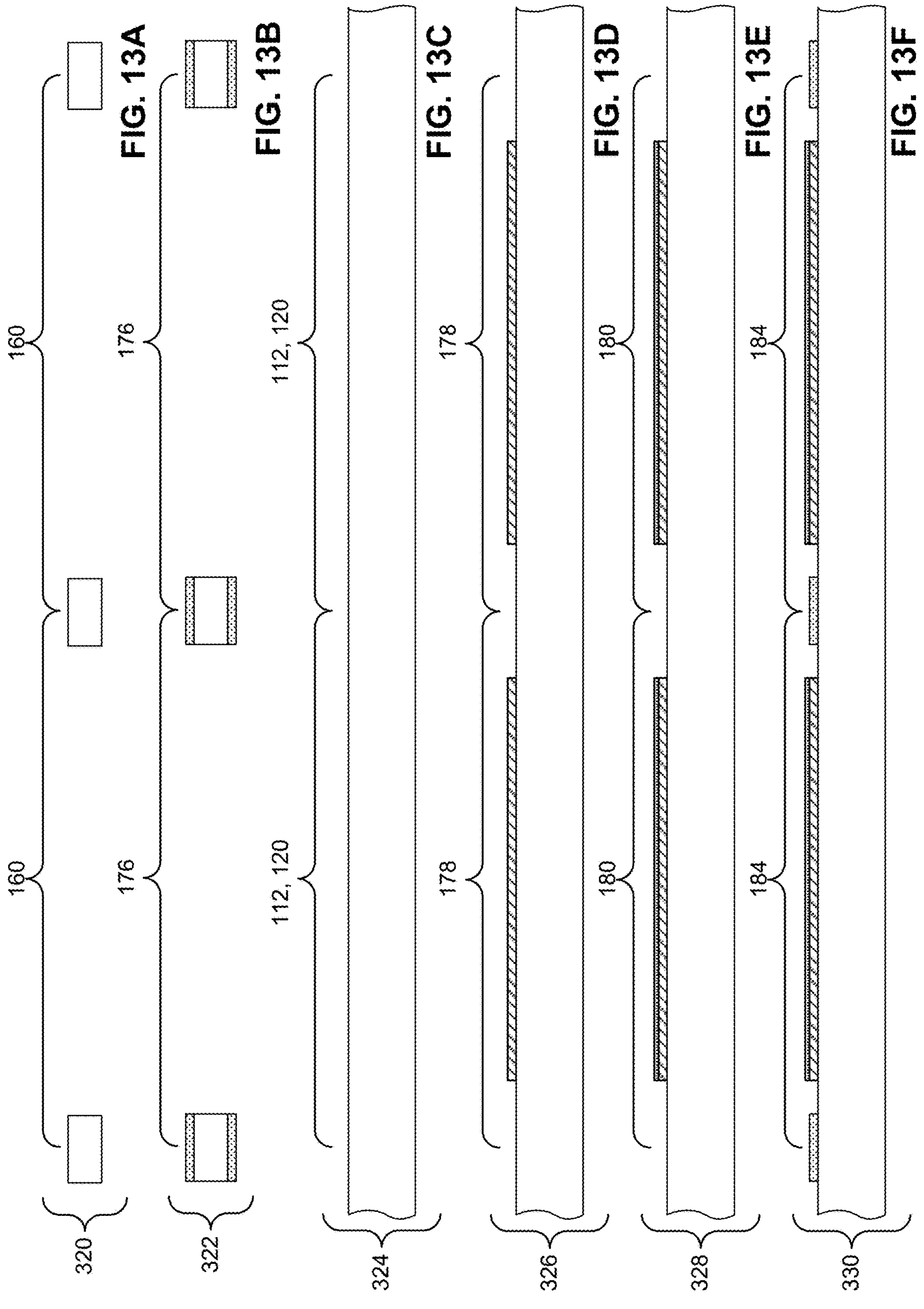
FIGS. 13A-13J show various stages of a fabrication process in which GDT/MOV devices similar to the GDT/MOV device of FIG. 6 can be fabricated in an array format.

Referring to FIG. 13A, an array 320 having a plurality of units (each unit indicated as 160) can be provided or formed. Each unit can be similar to the spacer layer 160 of FIG. 7A; thus, the array 320 of FIG. 13A can be an array of spacer layer units 160. Accordingly, the array 320 can be formed in an array format, where each unit is formed similar to the example of FIG. 7A.

Referring to FIG. 13B, the array 320 of FIG. 13A can be processed so as to yield a plurality of units 176, with each unit being similar to the example assembly 176 of FIG. 7B. Accordingly, an assembly 322 can be formed in an array format, where each unit is formed similar to the example of FIG. 7B.

Referring to FIG. 13C, an array 324 having a plurality of units (each unit indicated as 112, 120) can be provided or formed. Each unit can be similar to the metal oxide layer 112, 120 of FIG. 7C; thus, the array 324 of FIG. 13C can be an array of first metal oxide units 112, or an array of second metal oxide units 120. Accordingly, the array 324 can be formed in an array format, where each unit is formed similar to the example of FIG. 7C.

Referring to FIG. 13D, the array 324 of FIG. 13C can be processed so as to yield a plurality of units 178, with each unit being similar to the example assembly 178 of FIG. 7D. Accordingly, an assembly 326 can be formed in an array format, where each unit is formed similar to the example of FIG. 7D.

Referring to FIG. 13E, the assembly 326 of FIG. 13D can be processed so as to yield a plurality of units 180, with each unit being similar to the example assembly 180 of FIG. 7E. Accordingly, an assembly 328 can be formed in an array format, where each unit is formed similar to the example of FIG. 7E.

Referring to FIG. 13F, the assembly 328 of FIG. 13E can be processed so as to yield a plurality of units 184, with each unit being similar to the example assembly 180 of FIG. 7F. Accordingly, an assembly 330 can be formed in an array format, where each unit is formed similar to the example of FIG. 7F.

Figure 13G:
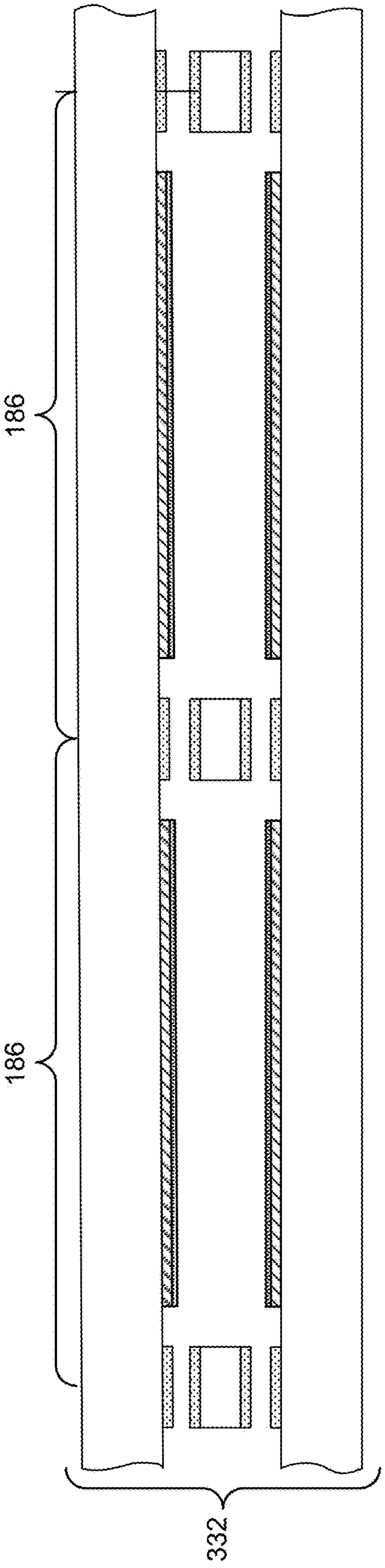

Referring to FIG. 13G, two of the assemblies 330 of FIG. 13F and the assembly 322 of FIG. 13B can be processed so as to yield a plurality of units 186, with each unit being similar to the example assembly 186 of FIG. 7G. Accordingly, an assembly 332 can be formed in an array format, where each unit is arranged similar to the example of FIG. 7G.

Figure 13H:
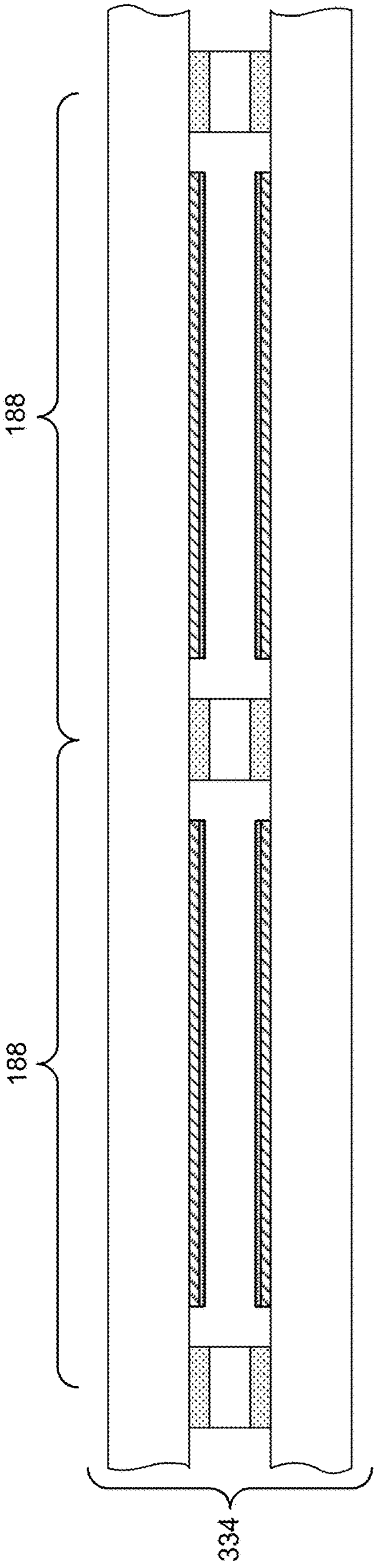

Referring to FIG. 13H, the assembly 332 of FIG. 13G can be processed so as to yield a plurality of units 188, with each unit being similar to the example assembly 188 of FIG. 7H. Accordingly, an assembly 334 can be formed in an array format, where each unit is formed similar to the example of FIG. 7H.

Figure 13I:
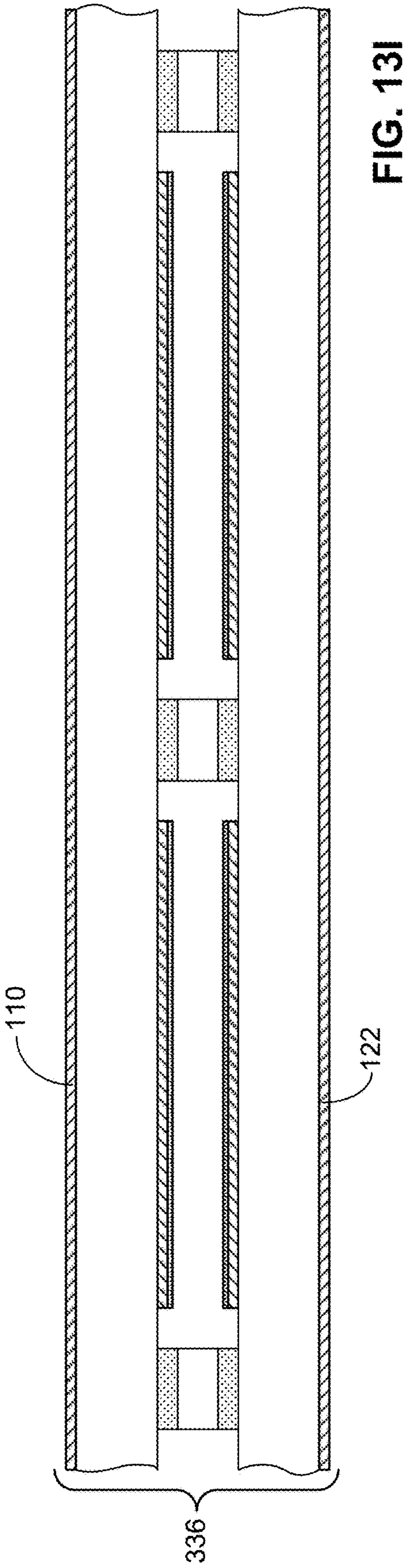

Referring to FIG. 13I, the assembly 334 of FIG. 13H can be processed so as to yield an assembly 336 that includes a plurality of joined units, with each unit being similar to the example assembly of FIG. 7I. Accordingly, an assembly 336 can be formed in an array format, where each unit is formed similar to the example of FIG. 7I.

Figure 13J:
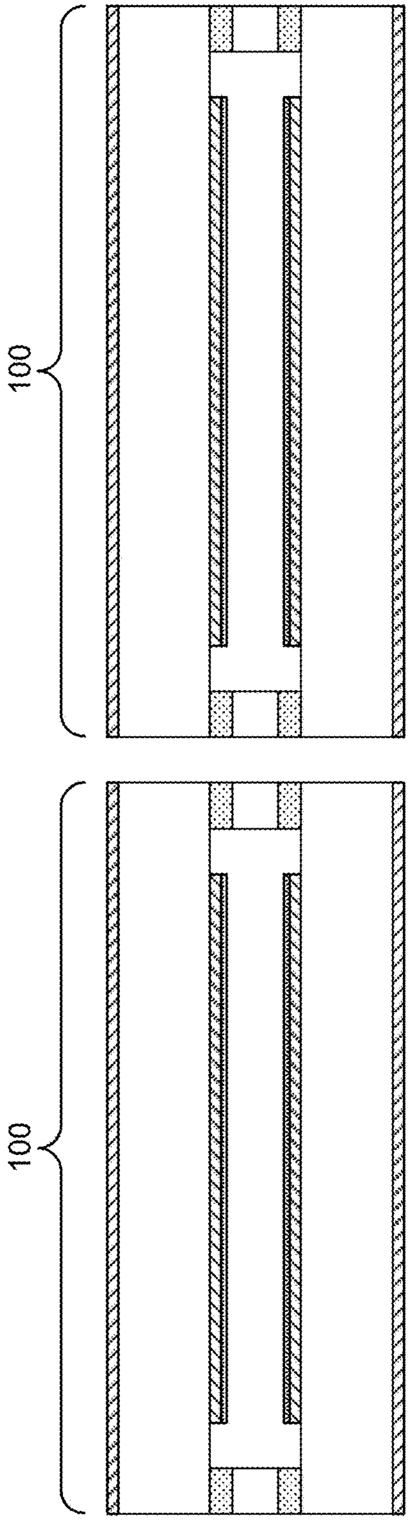

Referring to FIG. 13J, the assembly 336 of FIG. 13I can be processed so as to yield a plurality of individual units 100, with each unit being similar to the GDT/MOV device 100 of FIG. 7I. In some embodiments, such individual units can be obtained by singulation of the array-format assembly 336 of FIG. 13I. In some embodiments, such singulation process can include, for example, a cutting (e.g., saw cutting, blade cutting, laser cutting, etc.) process in which the entire stack assembly between two units is cut.

The fabrication examples of FIGS. 12A-12H and FIGS. 13A-13J are examples where substantially all of the respective processing steps can be achieved while in an array format, and the singulation step includes, for example, cutting of the entire stack assembly between two neighboring units. FIGS. 14A-14F show an example of a fabrication process where an array format is not utilized for all of the different layers. Accordingly, in such a fabrication process, a singulation step can include separation of units that are joined by one or more array format layers.

Figures 14A, 14B, 14C, 14D:
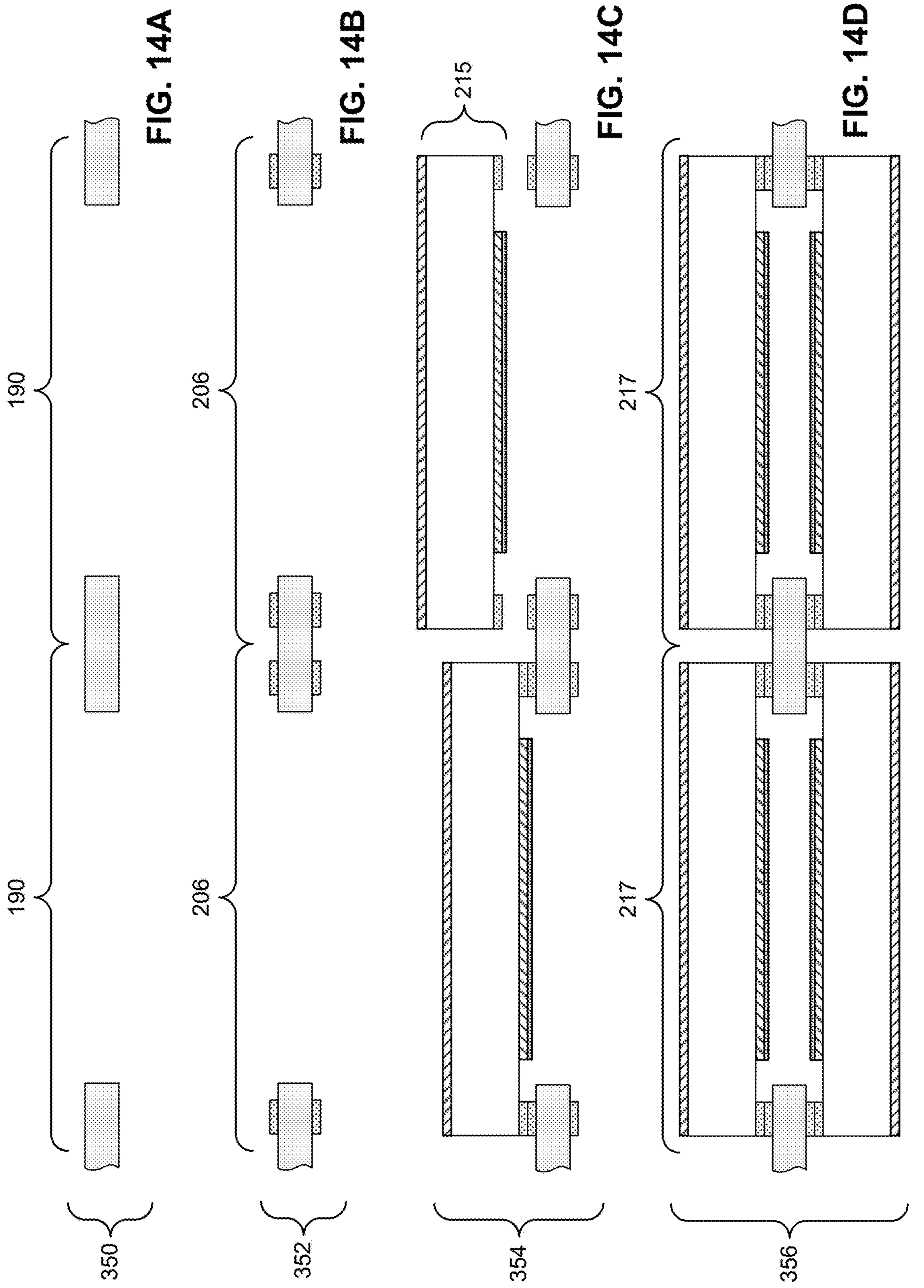
FIGS. 14A-14F show various stages of a fabrication process in which GDT/MOV devices similar to the GDT/MOV device of FIG. 8 can be fabricated in an array format.

For example, and referring to FIG. 14A, an array 350 having a plurality of units (each unit indicated as 190) can be provided or formed. Each unit can be similar to the wing-spacer layer 190 of FIG. 9A; thus, the array 350 of FIG. 14A can be an array of spacer layer units 190. Accordingly, the array 350 can be formed in an array format, where each unit is formed similar to the example of FIG. 9A.

In some embodiments, the array 350 of spacer layer units 190 can be configured to facilitate an easier singulation process. For example, a score feature can be provided along a line between two neighboring units 190. During singulation, such a score feature can allow the units 190 to be separated by, for example, application of a mechanical force (e.g., snapping each unit for separation). An example of such singulation is described herein in greater detail.

Referring to FIG. 14B, the array 350 of FIG. 14A can be processed so as to yield a plurality of units 206, with each unit being similar to the example assembly 206 of FIG. 9B. Accordingly, an assembly 352 can be formed in an array format, where each unit is formed similar to the example of FIG. 9B.

FIG. 14C shows that in some embodiments, an assembly 215 (that is similar to the example assembly 214 of FIG. 9F, but with an external electrode formed thereon) can be positioned on each unit (206) of the array format assembly 352 of FIG. 14B, so as to yield an assembly 354. In some embodiments, the assemblies 215 can be fabricated as discrete units, as singulated units after array format steps, or some combination thereof.

FIG. 14D shows that in some embodiments, the assemblies 215 can be positioned for each unit (206) of the array format assembly (352 in FIG. 14B) on each of the two sides, so as to form an assembly 356. Thus, each unit 217 in FIG. 14D is shown to include two assemblies 215. Such a unit (217) can be similar to the example assembly 216 of FIG. 9G, but with external electrodes formed thereon.

Figure 14E:
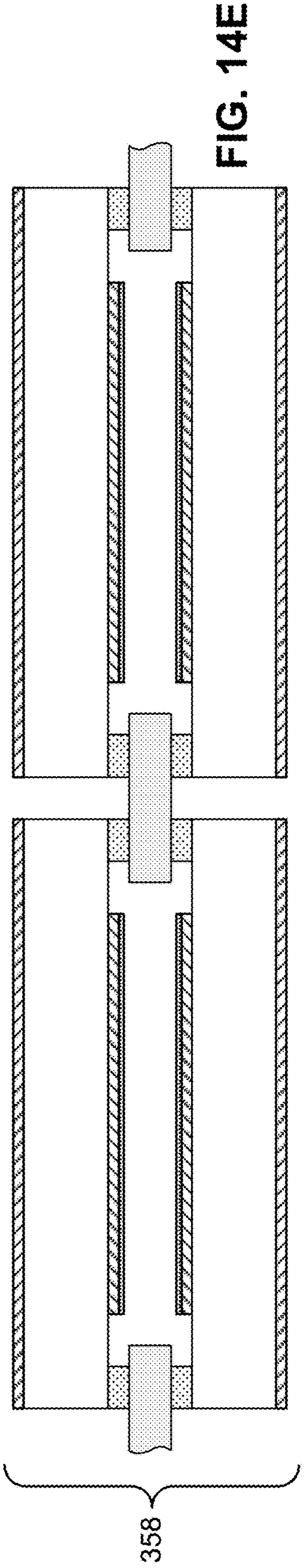

Referring to FIG. 14E, the assembly 356 of FIG. 14D can be processed so as to yield a plurality of joined units, with each unit being similar to the example assembly 218 of FIG. 9H, but with external electrodes formed thereon. Accordingly, an assembly 358 can remain in an array format, where each unit is similar to the example of FIG. 9I.

Figure 14F:
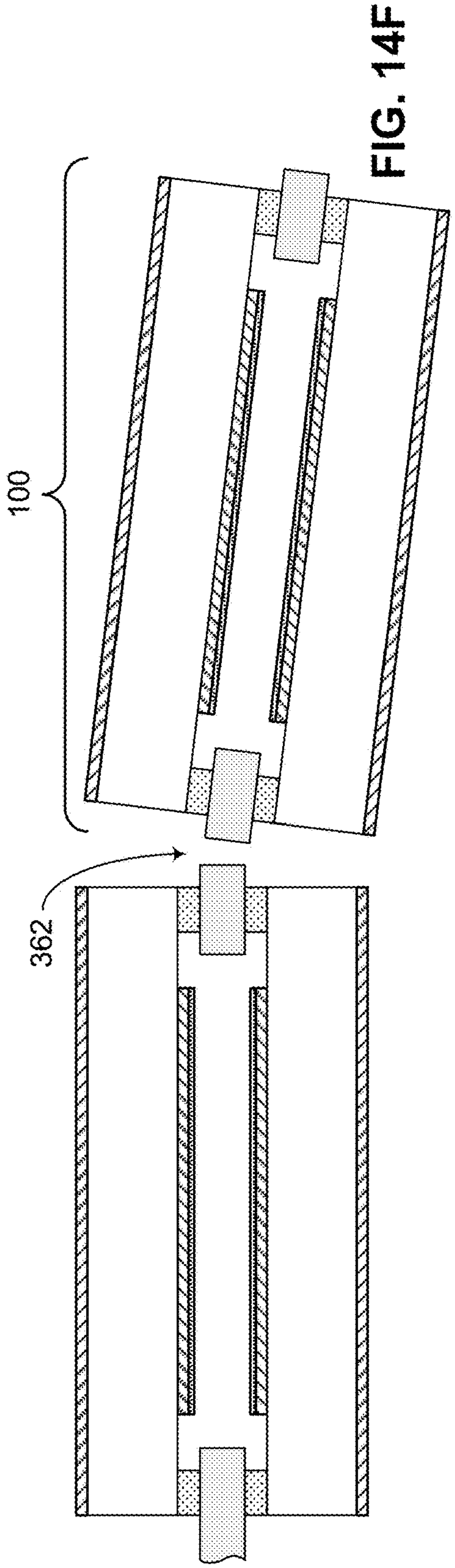

FIG. 14F shows that in some embodiments, individual units can be obtained by singulation of the assembly 358 of FIG. 14E. For example, an individual unit 100 (that is similar to the GDT/MOV device 100 of FIG. 9I) is shown to be separated from the neighboring unit by being snapped off at an approximately mid-location 362 of the spacer layer. In some embodiments, and as described herein, such singulation can be facilitated by, for example, a score feature at or near the mid-location 362 of the spacer layer. It will be understood that singulation of the spacer layer can also be achieved utilizing other techniques.

In the various examples described herein in reference to FIGS. 4-14, a given GDT/MOV device is assumed to include one GDT chamber. However, it will be understood that a GDT/MOV device having one or more features as described herein can include more than one GDT chamber.

Figure 15:
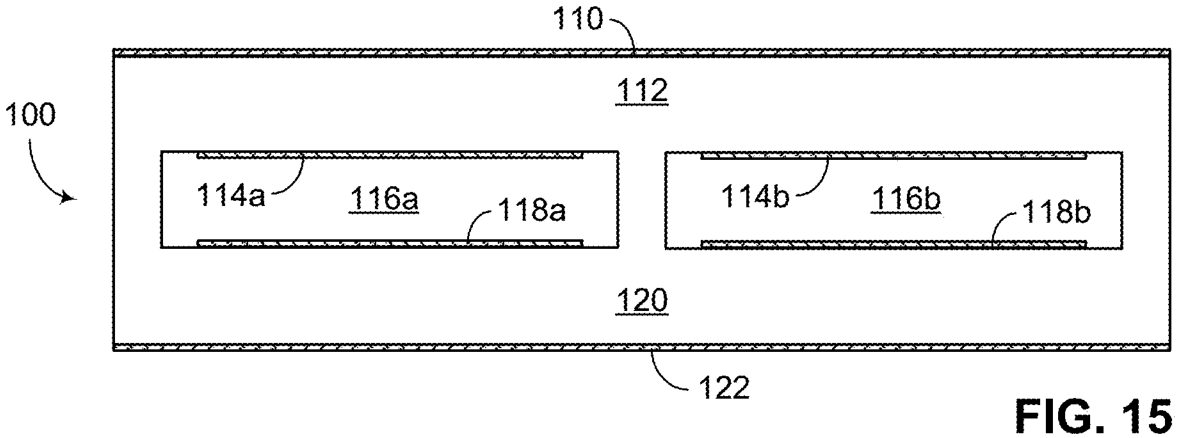
FIG. 15 shows that in some embodiments, a GDT/MOV can include a first metal oxide layer and a second metal oxide layer, and a plurality of GDT chambers implemented between the first and second metal oxide layers.

For example, FIG. 15 shows that in some embodiments, a GDT/MOV 100 can include a first metal oxide layer 112 and a second metal oxide layer 120, similar to the example of FIG. 2. Thus, various interfaces between such metal oxide layers can be implemented, including the examples described herein.

In the example of FIG. 15, a plurality of GDT chambers are shown to be implemented between the first and second metal oxide layers 112, 120. More particularly, a first GDT chamber 116*a* and a second GDT chamber 116*b* are shown to be implemented between the first and second metal oxide layers 112, 120. The first GDT chamber 116*a* is shown to be associated with inner electrodes 114*a*, 118*a*, and the second GDT chamber 116*b* is shown to be associated with inner electrodes 114*b*, 118*b*. Accordingly, a first MOV functionality can be provided by the first metal oxide layer 112, the inner electrodes 114*a*, 114*b*, and an outer electrode 110. Similarly, a second MOV functionality can be provided by the second metal oxide layer 120, the inner electrodes 118*a*, 118*b*, and an outer electrode 122.

Figure 16:
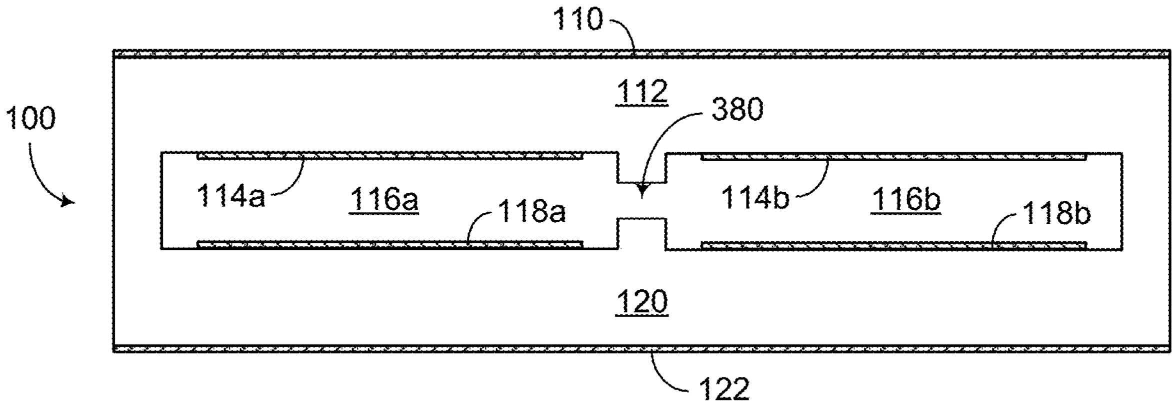
FIG. 16 shows that in some embodiments, a GDT/MOV device can include two GDT chambers that are in gas-communication with each other.

In the example of FIG. 15, the two GDT chambers (116*a*, 116*b*) are shown to be isolated from each other. In some embodiments, however, it may be desirable to have such GDT chambers be in communication with each other (e.g., in terms of gas). Thus, FIG. 16 shows that in some embodiments, a GDT/MOV device 100 can include two GDT chambers 116*a*, 116*b* that are in gas-communication with each other. In FIG. 16, such gas communication can be achieved by, for example, an opening 380 between the two GDT chambers 116*a*, 116*b*.

In some embodiments, the foregoing configuration of the example of FIG. 16 may be desirable, where gas equilibrium between the two GDT chambers is needed or desired, but electrical properties associated with two generally parallel chambers are also needed or desired. In the example of FIG. 16, various other parts of the GDT/MOV device 100 can be similar to the example of FIG. 15.

In many of the examples disclosed herein, a given GDT chamber is assumed to have associated with it one set of inner electrodes. However, it will be understood that other numbers of inner electrodes can also be utilized.

Figure 17:
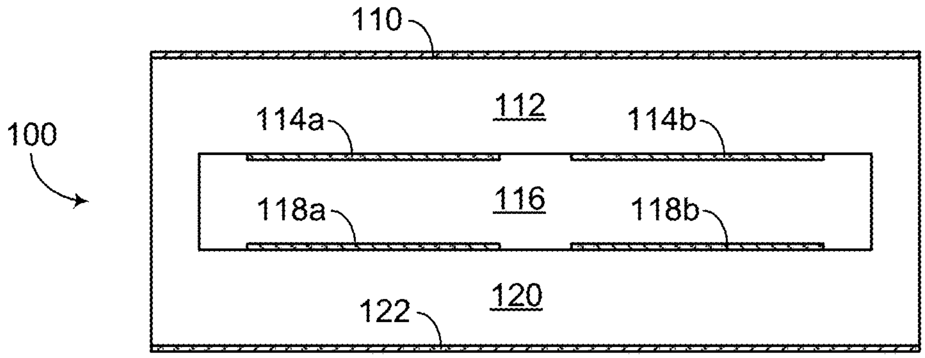
FIG. 17 shows that in some embodiments, a GDT/MOV device can include a GDT chamber facilitated by a plurality of inner electrodes on one side, and a plurality of inner electrodes on the other side.

For example, FIG. 17 shows that in some embodiments, a GDT/MOV device 100 can include a GDT chamber 116 facilitated by a plurality of inner electrodes 114*a*, 114*b* on one side, and a plurality of inner electrodes 118*a*, 118*b* on the other side. The inner electrodes 114*a*, 114*b* can function as a shared electrode for a first MOV associated with a first metal oxide layer 112. Similarly, the inner electrodes 118*a*, 118*b* can function as a shared electrode for a second MOV associated with a second metal oxide layer 120. It will be understood that other configurations of the inner electrodes can also be implemented. For example, the inner electrode (s) associated with the first MOV may or may not be the same as the inner electrode(s) associated with the second MOV.

Figure 18:
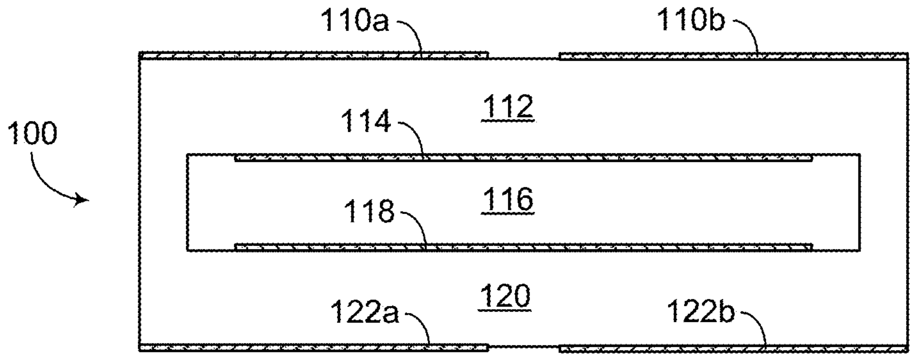
FIG. 18 shows that in some embodiments, an outer electrode functionality can be provided by a plurality of electrodes.

It will also be understood that the outer electrode 110 may or may not be the same as the outer electrode 122. Further, and as shown in FIG. 18, an outer electrode functionality can be provided by a plurality of electrodes. For example, electrodes 110*a*, 110*b* can provide an outer electrode functionality for a first MOV associated with a first metal oxide layer 112, and electrodes 122*a*, 122*b* can provide an outer electrode functionality for a second MOV associated with a second metal oxide layer 120.

Figure 19:
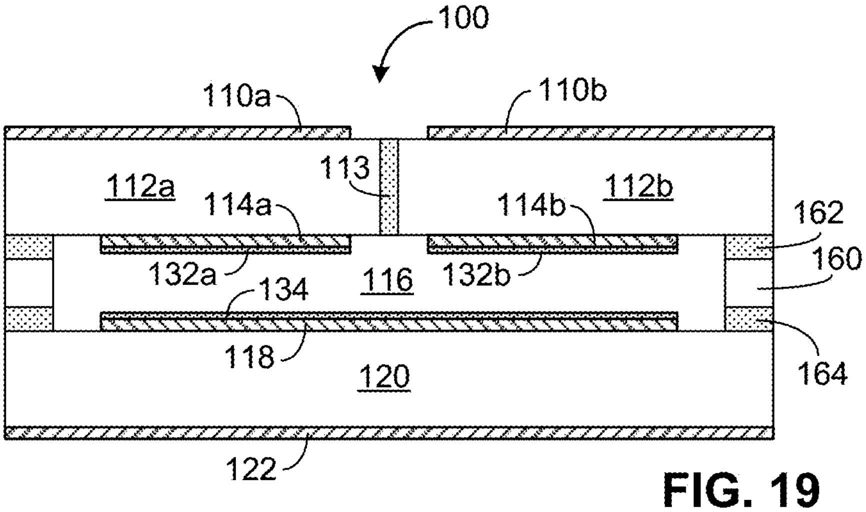
FIG. 19 shows that in some embodiments, a GDT/MOV device can include a GDT chamber and three MOV elements associated with the GDT chamber.

FIG. 19 shows that in some embodiments, a GDT/MOV device 100 can include a GDT chamber 116 and three MOV elements associated with the GDT chamber 116. In the example of FIG. 19, the spacer layer 160, seals 162, 164, emissive coating 134, inner electrode 118, metal oxide layer 120, and outer electrode 122 can be similar to the example described herein in reference to FIG. 6.

Unlike the example of FIG. 6 where a single-piece metal oxide layer 112 is provided between a single inner electrode 114 and a single outer electrode 110, the GDT/MOV device 100 of FIG. 19 has two electrically isolated metal oxide layers 112*a*, 112*b* implemented on the other side of the GDT chamber 116. In some embodiments, such two isolated metal oxide layers can be separated by an electrically insulating seal 113 (e.g., a glass seal). Such an electrically insulating seal can also provide sealing functionality for the GDT chamber 116.

In the example of FIG. 19, an inner electrode 114*a* and an optional emissive coating 132*a* are shown to be implemented on the inner side of the metal oxide layer 112*a*, and an outer electrode 110*a* is shown to be implemented on the outer side of the metal oxide layer 112*a*. Similarly, an inner electrode 114*b* and an optional emissive coating 132*b* are shown to be implemented on the inner side of the metal oxide layer 112*b*, and an outer electrode 110*b* is shown to be implemented on the outer side of the metal oxide layer 112*b*. Accordingly, the GDT/MOV device 100 is shown to include three MOV elements associated with the two metal oxide layers 112*a*, 112*b* on one side of the GDT chamber 116 and one metal oxide layer 120 on the other side of the GDT chamber 116.

In the example of FIG. 19, the edge region of the GDT/MOV device 100 is assumed to be similar to the example of FIG. 6. However, it will be understood that the device 100 of FIG. 19 can also be implemented using other edge region examples.

In some embodiments, a GDT/MOV device having one or more features as described herein, such as the examples of FIGS. 4-18, can be configured to provide symmetry or approximate symmetry about a mid-plane between first and second metal oxide layers or panels (for discrete or array-format processing). For example, given first and second metal oxide layers or panels can be dimensioned the same or approximately the same so as to provide such symmetry. Such symmetry or approximate symmetry can result in reduced mechanical stresses during various process steps, including steps involving temperature changes.

Figure 20:
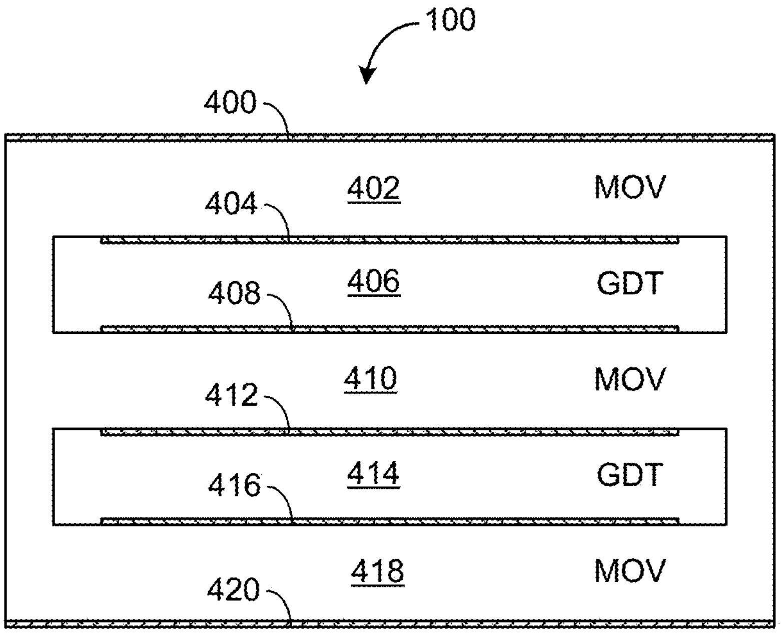
FIG. 20 shows that in some embodiments, two GDT/MOV devices can be implemented in series, in an integrated manner.
Figure 20:
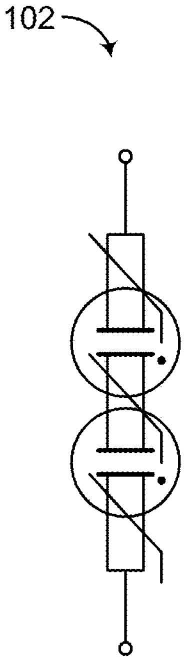

In some embodiments, a GDT/MOV device having one or more features as described herein can be combined with another device, including another GDT/MOV device. For example, FIG. 20 shows that in some embodiments, two GDT/MOV devices can be implemented in series, in an integrated manner. More particularly, first and second GDT chambers 406, 414 are shown to be implemented in an alternating arrangement with first (402), second (410) and third (418) metal oxide layers. Thus, an electrode 404 can be a shared electrode for the first metal oxide layer 402 and the first GDT chamber 406, an electrode 408 can be a shared electrode for the second metal oxide layer 410 and the first GDT chamber 406, an electrode 412 can be a shared electrode for the second metal oxide layer 410 and the second GDT chamber 414, and an electrode 416 can be a shared electrode for the third metal oxide layer 418 and the second GDT chamber 414.

Electrodes 400 and 420 can be implemented as outer electrodes for the GDT/MOV device 100. Accordingly, an electrical circuit representation of the structure of FIG. 20 can be depicted as 102.

Figure 21:
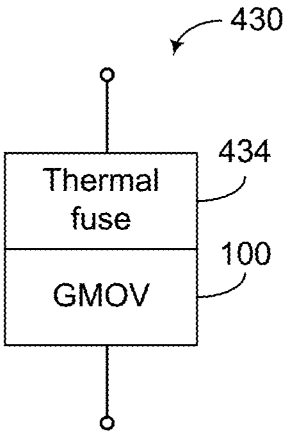
FIG. 21 shows that in some embodiments, a GDT/MOV device having one or more features as described herein can be arranged in series with a thermal fuse.
Figure 22:
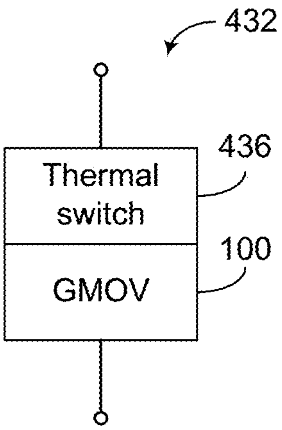
FIG. 22 shows that in some embodiments, a GDT/MOV device having one or more features as described herein can be arranged in series with a thermal switch.

FIGS. 21 and 22 show other examples where a GDT/MOV device can be combined with another electrical device. For example, FIG. 21 shows that in some embodiments, a GDT/MOV device 100 having one or more features as described herein can be arranged in series with a thermal fuse 434 (e.g., a single flow thermal fuse), so as to provide an arrangement 430. In some embodiments, the GDT/MOV device 100 can be in direct physical contact with the thermal fuse 434. In some embodiments, the GDT/MOV device 100 can be electrically connected, but not in direct physical contact, with the thermal fuse 434.

In another example, FIG. 22 shows that in some embodiments, a GDT/MOV device 100 having one or more features as described herein can be arranged in series with a thermal switch 436 (e.g., a resettable thermal cutoff (TCO)), so as to provide an arrangement 432. In some embodiments, the GDT/MOV device 100 can be in direct physical contact with the thermal switch 436. In some embodiments, the GDT/MOV device 100 can be electrically connected, but not in direct physical contact, with the thermal switch 436.

It will be understood that a GDT/MOV device having one or more features as described herein can also be implemented with one or more electrical components or device, in series, in parallel, or any combination thereof.

In some embodiments, MOV materials such as materials associated with the various metal oxide layers as described herein can include, for example, zinc oxide (ZnO) or ZnO-based material, and/or strontium titanate (SrTiO3) or SrTiO3-based material. In the context of the first example, a ZnO-based material can include or be formed by doping with other metal oxide compounds, such as Sb2O3, Bi2O3, MnO, Cr2O3, etc.

In some embodiments, an MOV material can include microstructure arrangement of metal oxides (e.g., ZnO particles) to provide a conduction mechanism. For example, a given ZnO particle or grain, which is generally semiconducting, can be separated from another ZnO grains by a thin insulating boundary layer. A breakdown voltage of such a boundary layer is approximately 3.2V. Thus, a given MOV device's breakdown voltage can be based on a number (e.g., an average number) of grains between two electrodes.

In some embodiments, some or all of the foregoing metal oxide layers can be implemented as a semiconducting ceramic material. With such a semiconducting ceramic layer, an outer electrode (e.g., configured as a terminal for mounting application) can be formed by first protecting the ceramic body before formation of the electrode (e.g., by plating). Such protecting of the ceramic body can be achieved by a formation of a passivation layer on the ceramic body utilizing chemical and/or physical application techniques. For example, a physical application technique can involve coating of the semiconducting ceramic body with some insulating polymer. In another example, a chemical application technique can involve a chemical reaction that results in an exposed surface of the semiconducting ceramic body becoming electrically insulating, at least for the purpose of formation of the electrode.

It is noted that at least the foregoing ZnO-based material and the SrTiO3-based material implemented as described herein generally do not include piezoelectric material and/or do not include piezoelectric property. Thus, in some embodiments, MOV materials such as materials associated with the various metal oxide layers as described herein, including some or all of the foregoing examples, can be configured to not have any significant amount of piezoelectric materials, and/or not have any significant amount of piezoelectric properties. In some embodiments, a GDT/MOV device having one or more features as described herein can include materials, such as materials associated with the various metal oxide layers as described herein, that are configured to not utilize any significant amount of piezoelectric property, even if present in small amounts. It will be understood that the foregoing piezoelectric properties can include, for example, a piezoresistivity property.

In some embodiments, spacer layers as described herein can include, for example, ceramic or alumina.

In some embodiments, various GDT chambers as described herein can be filled with, for example, neon, argon, nitrogen, and/or hydrogen.

In some embodiments, various inner or shared electrodes as described herein can be formed with, for example, silver, copper and/or tungsten. Formation of such electrodes can be achieved by, for example, screen printing, pad printing, or evaporation/photo-etch techniques; and some or all of such techniques can be followed by a sintering step.

In some embodiments, various outer electrodes as described herein can be formed with, for example, silver overplated with nickel or tin. Formation of such electrodes can be achieved by, for example, screen printing or pad printing techniques; and some or all of such techniques can be followed by a sintering step.

In some embodiments, various optional emissive coatings as described herein can be formed with, for example, various metals, salts and halide compounds.

Unless the context clearly requires otherwise, throughout the description and the claims, the words “comprise,” “comprising,” and the like are to be construed in an inclusive sense, as opposed to an exclusive or exhaustive sense; that is to say, in the sense of “including, but not limited to.” The word “coupled”, as generally used herein, refers to two or more elements that may be either directly connected, or connected by way of one or more intermediate elements. Additionally, the words “herein,” “above,” “below,” and words of similar import, when used in this application, shall refer to this application as a whole and not to any particular portions of this application. Where the context permits, words in the above Detailed Description using the singular or plural number may also include the plural or singular number respectively. The word “or” in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. An electrical device comprising:

a first metal oxide layer and a second metal oxide layer, each metal oxide layer being free of a piezoelectric property and having an outer side and an inner side, the inner side having a pocket defined by a floor and a raised perimeter around the floor;

first and second outer electrodes implemented on the outer sides of the first and second metal oxide layers, respectively;

first and second inner electrodes implemented on the floors of the first and second metal oxide layers, respectively; and an electrically insulating seal that joins the perimeters of the inner sides of the first and second metal oxide layers, such that the first outer electrode, the first metal oxide layer and the first inner electrode form a first metal oxide varistor (MOV), the first inner electrode, the second inner electrode and the respective pockets form a gas discharge tube (GDT), and the second inner electrode, the second metal oxide layer and the second outer electrode form a second MOV.

2. The electrical device of claim 1, wherein the electrically insulating seal includes a glass seal.

3. The electrical device of claim 1, wherein the first and second metal oxide layers are electrically insulated from each other by only the electrically insulating seal.

4. The electrical device of claim 1, wherein the first metal oxide layer is an approximate mirror image of the second metal oxide layer about a mid-plane between the first and second metal oxide layers.

5. The electrical device of claim 1, further comprising an emissive coating formed over each of the first and second inner electrodes.

6. The electrical device of claim 1, wherein each of the first and second metal oxide layers is free of a piezoelectric material.

7. A method for manufacturing an electrical device, the method comprising:

providing or forming a first metal oxide layer and a second metal oxide layer each being free of a piezoelectric property and having an outer side and an inner side, such that the inner side has a pocket defined by a floor and a raised perimeter around the floor;

forming first and second inner electrodes on the inner sides of the first and second metal oxide layers, respectively;

joining the raised perimeters of the inner sides of the first and second metal oxide layers with an electrically insulating seal; and forming first and second outer electrodes on the outer sides of the first and second metal oxide layers, respectively, such that the first outer electrode, the first metal oxide layer and the first inner electrode form a first metal oxide varistor (MOV), the first inner electrode, the second inner electrode and the respective pockets form a gas discharge tube (GDT), and the second inner electrode, the second metal oxide layer and the second outer electrode form a second MOV.

8. The method of claim 7, wherein at least some of the steps are performed in an array format in which a plurality of units are joined in an array, with each unit corresponding to a partially or completely fabricated form of the electrical device.

* * * * *